US011034500B2

(12) United States Patent
Kim et al.

(10) Patent No.: US 11,034,500 B2
(45) Date of Patent: Jun. 15, 2021

(54) PACKING CONTAINER FOR DISPLAY DEVICE

(71) Applicant: SAMSUNG DISPLAY CO., LTD., Yongin-si (KR)

(72) Inventors: Hongju Kim, Yongin-si (KR); Jahuem Koo, Seoul (KR); Euiyoung Kim, Yongin-si (KR); Kyungjae Lee, Hwaseong-si (KR); Sungjin Joo, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 145 days.

(21) Appl. No.: 16/266,239

(22) Filed: Feb. 4, 2019

(65) Prior Publication Data

US 2019/0248560 A1  Aug. 15, 2019

(30) Foreign Application Priority Data

Feb. 14, 2018 (KR) .......................... 10-2018-0018286

(51) Int. Cl.
| | |
|---|---|
| *B65D 81/02* | (2006.01) |
| *B65D 81/113* | (2006.01) |
| *B65D 73/02* | (2006.01) |
| *B65D 81/05* | (2006.01) |
| *G09G 3/20* | (2006.01) |

(52) U.S. Cl.
CPC .......... *B65D 81/022* (2013.01); *B65D 73/02* (2013.01); *B65D 81/053* (2013.01); *B65D 81/113* (2013.01); *G09G 3/20* (2013.01); *B65D 2585/86* (2013.01)

(58) Field of Classification Search
CPC .... B65D 81/022; B65D 85/62; B65D 81/113; B65D 73/02; B65D 81/053; B65D 2585/86; G06F 1/1637
USPC ......................................... 206/454, 701, 499
See application file for complete search history.

(56) References Cited

U.S. PATENT DOCUMENTS

| | | | |
|---|---|---|---|
| 2007/0258061 A1* | 11/2007 | Puerto | H01L 21/67359 355/30 |
| 2012/0037522 A1* | 2/2012 | Chiu | H01L 21/67353 206/316.1 |
| 2018/0210349 A1* | 7/2018 | Hsueh | G03F 7/70741 |

FOREIGN PATENT DOCUMENTS

| | | |
|---|---|---|
| JP | 2010-285156 | 12/2010 |
| KR | 10-2011-0008397 | 1/2011 |
| KR | 10-1136235 | 4/2012 |

(Continued)

*Primary Examiner* — Steven A. Reynolds
(74) *Attorney, Agent, or Firm* — F. Chau & Associates, LLC

(57) ABSTRACT

A packing container for a display device includes: a main tray; a first panel support portion configured to protrude from a base portion disposed inside the main tray; a first base protruding portion configured to protrude from the base portion, and to be opposite to a first side surface of the first panel support portion; and a first sub-tray located on the first panel support portion of the main tray, wherein the first sub-tray includes: a second panel support portion located on the main tray, wherein the second panel support portion is opposite to a panel support surface of the first panel support portion; and a first lower protruding portion configured to protrude from a first edge of the second panel support portion toward the base portion, and to have an end portion between the first side surface of the first panel support portion and the first base protruding portion.

28 Claims, 10 Drawing Sheets

(56) References Cited

FOREIGN PATENT DOCUMENTS

KR 10-2012-0063944 6/2012
KR 10-1534257 6/2015

* cited by examiner

PACKING CONTAINER FOR DISPLAY DEVICE

CROSS-REFERENCE TO RELATED APPLICATION

This application claims priority under 35 U.S.C. § 119 to Korean Patent Application No. 10-2018-0018286, filed on Feb. 14, 2018, in the Korean Intellectual Property Office (KIPO), the disclosure of which is incorporated by reference herein in its entirety.

TECHNICAL FIELD

The present disclosure relates to a packing container for a display device, and more particularly to a packing container for a display device capable of preventing a display panel and driving drivers from being separated from each other.

DISCUSSION OF RELATED ART

A display device includes a display panel that houses circuitry for operating a display. The circuitry is driven by gate and data drivers which are coupled to the display panel.

When gate and data drivers are coupled to a display panel having a narrow bezel, the gate and data drivers may be attached onto sides of the display panel such that the gate and data drivers are bent at a predetermined angle with respect to the display panel. The gate and data drivers may get separated from the display panel when other components such as a display device is packed with the display panel in a common package housing.

SUMMARY

According to an exemplary embodiment of the present invention, a packing container for a display device includes: a main tray; a first panel support portion configured to protrude from a base portion disposed inside the main tray; a first base protruding portion configured to protrude from the base portion, and to be opposite to a first side surface of the first panel support portion; and a first sub-tray located on the first panel support portion of the main tray, wherein the first sub-tray includes: a second panel support portion located on the main tray, wherein the second panel support portion is opposite to a panel support surface of the first panel support portion; and a first lower protruding portion configured to protrude from a first edge of the second panel support portion toward the base portion, and to have an end portion located between the first side surface of the first panel support portion and the first base protruding portion.

In an exemplary embodiment of the present invention, the first sub-tray further includes a first upper protruding portion configured to protrude from a second edge of the second panel support portion opposite to the first edge of the second panel support portion, wherein the first upper protruding portion protrudes in a direction opposite to a direction in which the first lower protruding portion protrudes.

In an exemplary embodiment of the present invention, a first surface of the first lower protruding portion of the first sub-tray is in contact with and faces a first surface of the first base protruding portion.

In an exemplary embodiment of the present invention, the main tray further includes a second base protruding portion configured to protrude from the base portion and to be opposite to the first side surface with the first base protruding portion disposed therebetween.

In an exemplary embodiment of the present invention, the packing container further includes a second sub-tray located on the first sub-tray.

In an exemplary embodiment of the present invention, the second sub-tray includes: a third panel support portion located on the first sub-tray, wherein the third panel support portion is opposite to a panel support surface of the second panel support portion; and a first lower protruding portion configured to protrude from a first edge of the third panel support portion toward the base portion and to have an end portion located between the first lower protruding portion of the first sub-tray and the second base protruding portion.

In an exemplary embodiment of the present invention, a first surface of the first lower protruding portion of the second sub-tray is in contact with and faces a first surface of the second base protruding portion.

In an exemplary embodiment of the present invention, a first surface of the first lower protruding portion of the second sub-tray and a first surface of the first lower protruding portion of the first sub-tray are opposite each other and do not come into contact with each other.

In an exemplary embodiment of the present invention, a second edge of the third panel support portion opposite to the first edge of the third panel support portion is adjacent to the first upper protruding portion of the first sub-tray.

In an exemplary embodiment of the present invention, the second base protruding portion has a length different from that of the first base protruding portion.

In an exemplary embodiment of the present invention, the length of the second base protruding portion is larger than that of the first base protruding portion.

In an exemplary embodiment of the present invention, the second base protruding portion has a height different from that of the first base protruding portion.

In an exemplary embodiment of the present invention, the height of the second base protruding portion is larger than that of the first base protruding portion.

In an exemplary embodiment of the present invention, the main tray further includes a third base protruding portion configured to protrude from the base portion and to be opposite to a second side surface of the first panel support portion.

In an exemplary embodiment of the present invention, the first sub-tray further includes a second lower protruding portion configured to protrude from a third edge of the second panel support portion adjacent to the first edge of the second panel support portion toward the base portion and to have an end portion located between the second side surface of the first panel support portion and the third base protruding portion.

In an exemplary embodiment of the present invention, a first surface of the second lower protruding portion of the first sub-tray and a first surface of the third base protruding portion face each other and come into contact with each other.

In an exemplary embodiment of the present invention, the second sub-tray further includes a second lower protruding portion configured to protrude from a third edge of the third panel support portion adjacent to the first edge of the third panel support portion toward the base portion and to have an end portion located between the second lower protruding portion of the first sub-tray and a fourth base protruding portion.

In an exemplary embodiment of the present invention, a first surface of the second lower protruding portion of the second sub-tray and the first surface of the second lower protruding portion of the first sub-tray face each other and do not come into contact with each other.

In an exemplary embodiment of the present invention, the first sub-tray further includes a second upper protruding portion configured to protrude from a fourth edge of the second panel support portion adjacent to the first edge of the second panel support portion, and the second upper protruding portion protrudes in a direction opposite to a direction in which the first lower protruding portion protrudes.

In an exemplary embodiment of the present invention, the third edge of the third panel support portion adjacent to the first edge of the third panel support portion is opposite to the second upper protruding portion of the first sub-tray.

In an exemplary embodiment of the present invention, the main tray further includes a fourth base protruding portion configured to protrude from the base portion and to be opposite to the second side surface of the first panel support portion with the third base protruding portion interposed therebetween.

In an exemplary embodiment of the present invention, the fourth base protruding portion has a length different from that of the third base protruding portion.

In an exemplary embodiment of the present invention, the fourth base protruding portion has a length larger than that of the third base protruding portion.

In an exemplary embodiment of the present invention, the fourth base protruding portion has a height different from that of the third base protruding portion.

In an exemplary embodiment of the present invention, the height of the fourth base protruding portion is larger than that of the third base protruding portion.

In an exemplary embodiment of the present invention, an end portion of the first lower protruding portion of the first sub-tray comes into contact with the base portion.

In an exemplary embodiment of the present invention, the packing container further includes an elastic member located between a first surface of the first lower protruding portion of the first sub-tray and a first surface of the first base protruding portion.

In an exemplary embodiment of the present invention, the packing container further includes a cushioning member disposed between the second panel support portion of the first sub-tray and the first panel support portion.

In an exemplary embodiment of the present invention, a first side surface and top surface of the first panel support portion form an angle of about 90 degrees.

In an exemplary embodiment of the present invention, an outer surface of the first lower protruding portion and a top surface of the second panel support portion form an angle of about 90 degrees.

According to an exemplary embodiment of the present invention, a packing container includes: a main tray; a first panel support portion protruding from a base portion of the main tray; a first base protruding portion protruding from the base portion and extending along a first side surface of the first panel support portion; a second base protruding portion protruding from the base portion and extending along the first side surface of the first panel support portion, wherein the second base protruding portion is longer than the first base protruding portion; a first sub-tray disposed on the first panel support portion, wherein the first sub-tray includes: a second panel support portion disposed on a top surface of the first panel support portion; and a first lower protruding portion extending from the second panel support portion and overlapping the first side surface of the first panel support portion; and a second sub-tray disposed on the first sub-tray, wherein the second sub-tray includes: a third panel support portion disposed on the second panel support portion; and a first lower protruding portion extending from the third panel support portion and overlapping the first lower protruding portion of the first sub-tray.

In an exemplary embodiment of the present invention, a display device is disposed between the first panel support portion and the first sub-tray.

In an exemplary embodiment of the present invention, the first lower protruding portion of the first sub-tray extends from a first edge of the second panel support portion, and the first sub-tray further includes first upper protruding portions adjacent to a second edge, opposite to the first edge, of the second panel support portion and protruding from the second panel support portion in a direction opposite to that of the first lower protruding portion of the first sub-tray, wherein an edge of the third panel support portion is adjacent to the first upper protruding portions.

BRIEF DESCRIPTION OF THE DRAWINGS

A more complete appreciation of the present invention and many of the attendant aspects thereof will be readily obtained as the same becomes better understood by reference to the following detailed description when considered in connection with the accompanying drawing, wherein.

DETAILED DESCRIPTION OF THE EMBODIMENTS

Figure 1:
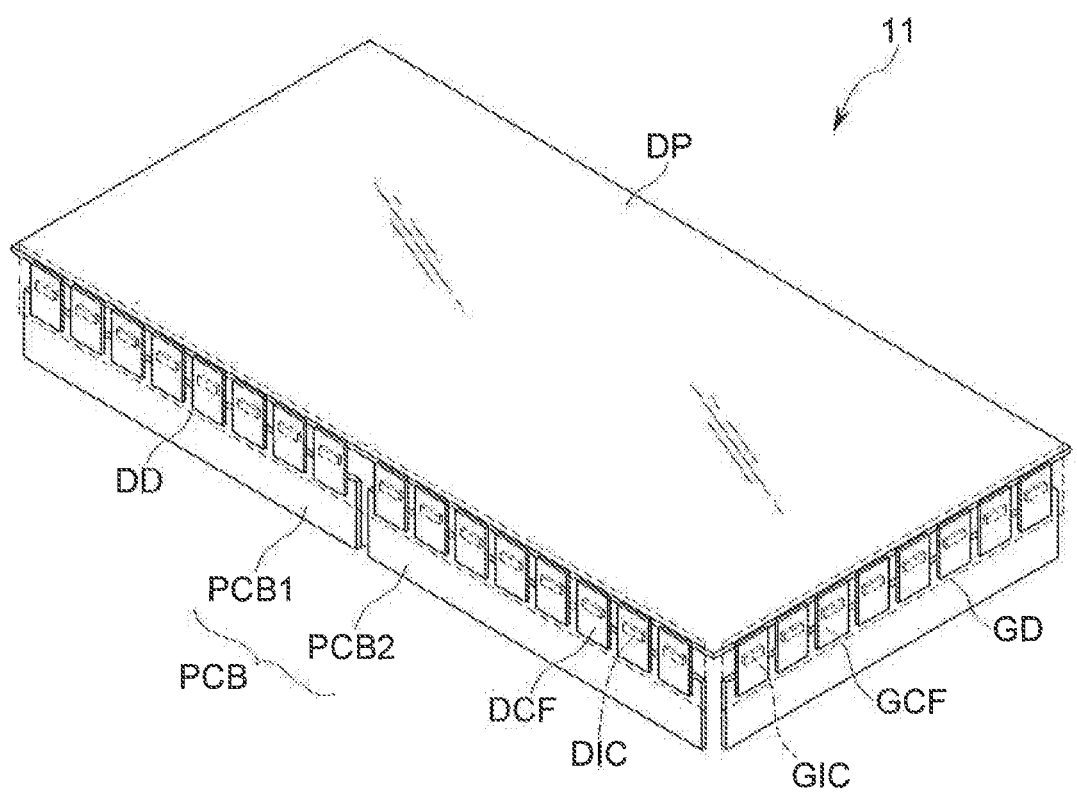
FIG. 1 is a view showing a display device according to an exemplary embodiment of the present invention.

Exemplary embodiments of the present invention will now be described more fully hereinafter with reference to the accompanying drawings. However, the present invention is not limited to the following exemplary embodiments, but may be implemented in various different forms. Throughout the specification, the same reference symbols may refer to the same components.

Throughout the drawings, sizes of elements may be exaggerated for clarity. In other words, since sizes and thicknesses of components in the drawings may be exaggerated for clarity, the following exemplary embodiments of the present invention are not limited thereto. It will be understood that when an element or layer is referred to as being "on" another element or layer, the element or layer may be directly on another element or layer or intervening elements or layers may be present.

Spatially relative terms, such as "below", "beneath", "lower", "above", "upper", and the like, may be used herein for ease of description to describe the relationship between one element or feature and another element(s) or feature(s) as illustrated in the drawings. It will be understood that the spatially relative terms are intended to encompass different orientations of the device in use or operation in addition to the orientation depicted in the drawings. For example, if the device in the drawings is turned over, elements described as "below" or "beneath" other elements or features would then be oriented "above" the other elements or features. Accordingly, in the example, the terms "below" and "beneath" can encompass both the orientations of above, beneath and below. The device may be also oriented in another direction (e.g., rotated 90 degrees or at other orientations), and thus the spatially relative terms may be interpreted differently depending on the orientation.

It will be understood that when an element is referred to as being "connected" or "coupled" to another element, the element may be directly connected or coupled to the other element or intervening elements.

Although the terms "first," "second," "third," etc. may be used herein to describe various components, these components should not be limited by these terms. These terms may be each used merely to distinguish one component from another component. For example, a first component may be termed a second or third element without departing from the spirit and scope of the present invention.

Packing containers for a display device according to exemplary embodiments of the present invention will be described in detail below with reference to FIGS. 1 to 12.

FIG. 1 is a view showing a display device according to an exemplary embodiment of the present invention.

As shown in FIG. 1, a display device 11 according to an exemplary embodiment of the present invention includes a display panel DP, a gate driver GD, a data driver DD, and a printed circuit board PCB.

Although not shown in this drawing, the display panel DP includes a plurality of pixels, a plurality of gate lines, and a plurality of data lines. The data lines intersect the gate lines. Each of the pixels is connected to a corresponding a corresponding gate line and a corresponding data line.

The gate driver GD is connected to one side edge of the display panel DP. The gate driver GD drives the gate lines of the display panel DP. The gate driver GD sequentially feeds gate signals to the gate lines.

The gate driver GD is connected to a side surface of the display panel DP to minimize the size of the bezel of the display device 11. Accordingly, the display panel DP and the gate driver GD form a predetermined angle. For example, the display panel DP and the gate driver GD may form an angle of about 90 degrees.

The gate driver GD includes a plurality of gate driver integrated circuits GICs and a plurality of gate carrier films GCFs. The plurality of gate driver integrated circuits GICs are mounted on the plurality of gate carrier films GCFs, respectively.

The plurality of gate carrier films GCFs are connected to one side edge of the display panel DP. For example, the gate carrier films GCF may be a tape carrier package.

The data driver DD is connected to another side edge of the display panel DP. For example, a side edge to which the data driver DD is connected may be perpendicular to the side edge to which the gate driver GD is connected. The data driver DD drives the data lines of the display panel DP. The data driver DD feeds data signals (i.e., image data signals) to the data lines.

The data driver DD is connected to a side surface of the display panel DP to minimize the size of the bezel of the display device 11. Accordingly, the display panel DP and the data driver DD may form a predetermined angle. For example, the display panel DP and the data driver DD may form an angle of about 90 degrees.

The data driver DD includes a plurality of data driver integrated circuits DICs and a plurality of data carrier films DCFs.

The data driver integrated circuits DICs receive digital image data signals and data control signals from the timing controller of the printed circuit board PCB.

The data driver integrated circuits DICs sample digital image data signals in response to the data control signals, latch sampled image data signals corresponding to one horizontal line for each horizontal period, and feed the latched image data signals to the data lines. For example, the data driver integrated circuit DICs convert digital image data signals, input from the timing controller, into analog image signals by using gamma voltage input from a power supply unit, and feed the analog image signals to the data lines.

The plurality of data driver integrated circuits DICs are mounted on the plurality of data carrier films DCFs, respectively.

The data carrier films DCFs are connected to the printed circuit board PCB and the display panel DP. For example, the data carrier films DCFs connect the printed circuit board PCB and the display panel DP to each other.

The above-described timing controller and power supply unit may be located on the printed circuit board PCB. The data carrier films DCFs include input lines configured to transmit various types of signals, output from the timing controller and the power supply unit, to the data driver integrated circuits DICs. In addition, the data carrier films DCFs include output lines configured to transmit image data signals, output from the data driver integrated circuits DICs, to the corresponding data lines. At least one of the data carrier films DCF transmits various types of signals from the timing controller and the power supply unit to the gate driver GD.

The printed circuit board PCB may include a first printed circuit board PCB1 and a second printed circuit board PCB2 which are separated from each other. However, the present invention is not limited thereto. For example, the printed circuit board PCB may be a single body. The first printed circuit board PCB1 is connected to some of the plurality of data carrier films DCFs, and the second printed circuit board PCB2 is connected to the remaining ones of the data carrier films DCFs.

The display device 11 may be contained and carried in a packing container for a display device. A packing container for a display device according to an exemplary embodiment of the present invention will be described in detail below.

Figure 2:
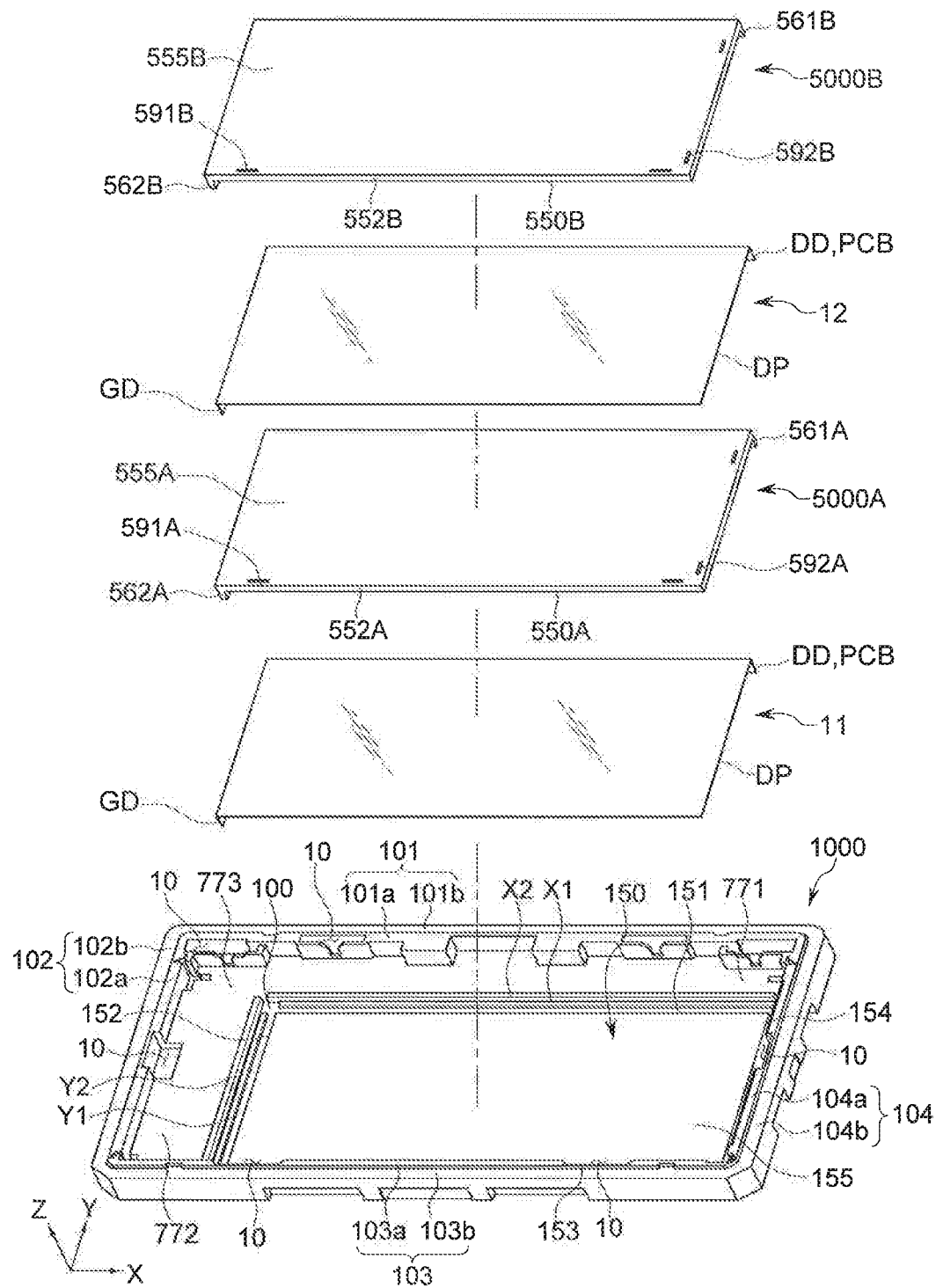
FIG. 2 is an exploded perspective view of a packing container for a display device according to an exemplary embodiment of the present invention.
Figure 3:
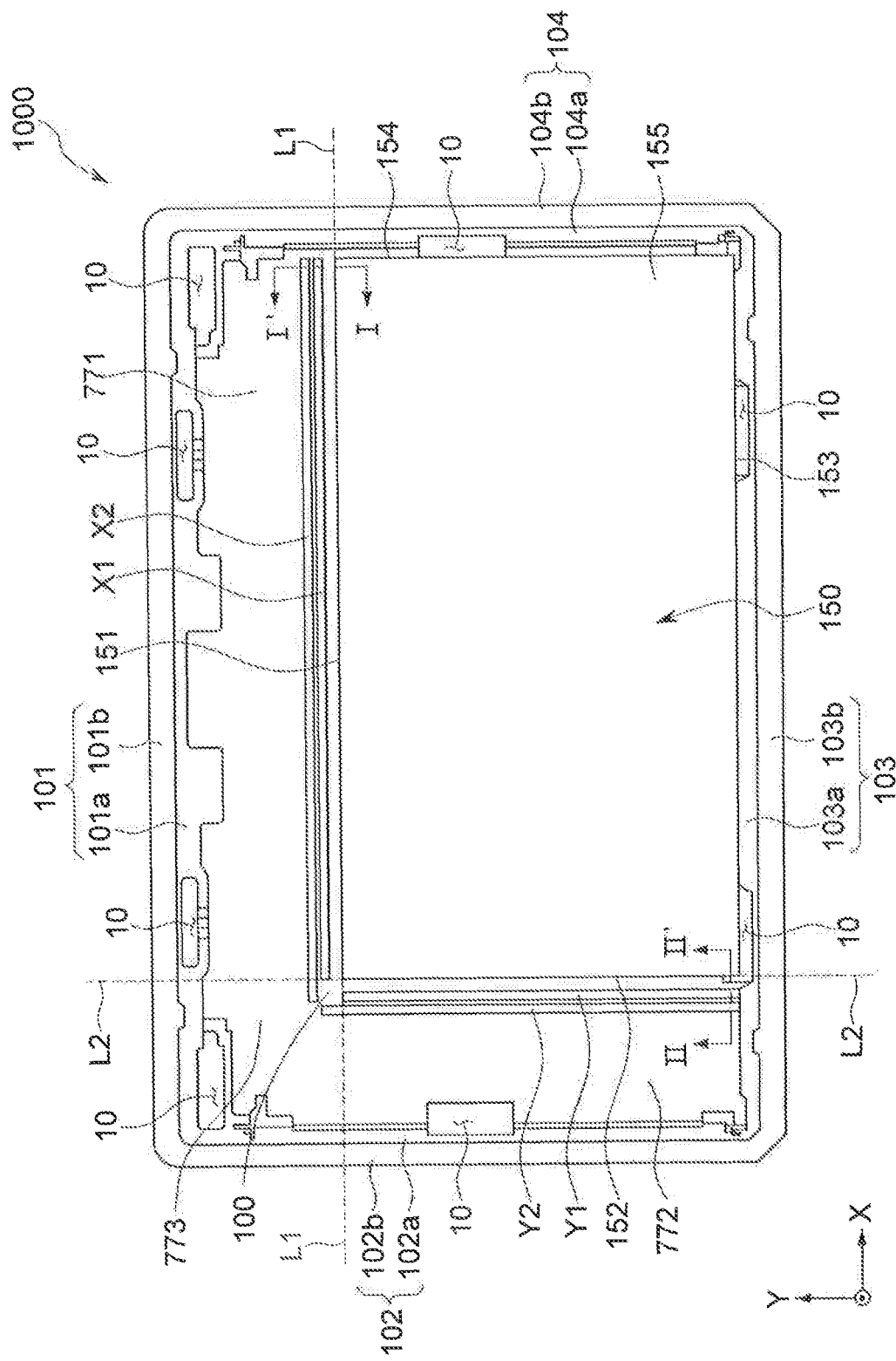
FIG. 3 is a plan view of a main tray shown in FIG. 2.
Figure 4:
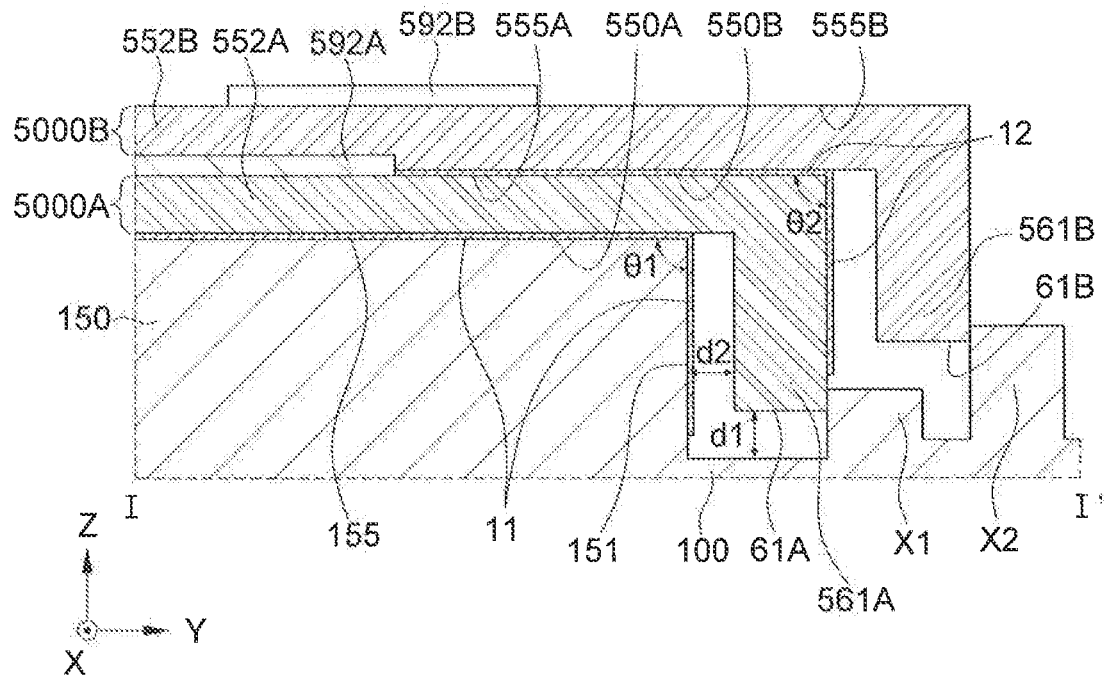
FIG. 4 is a sectional view taken along line I-I' of FIG. 3.
Figure 5:
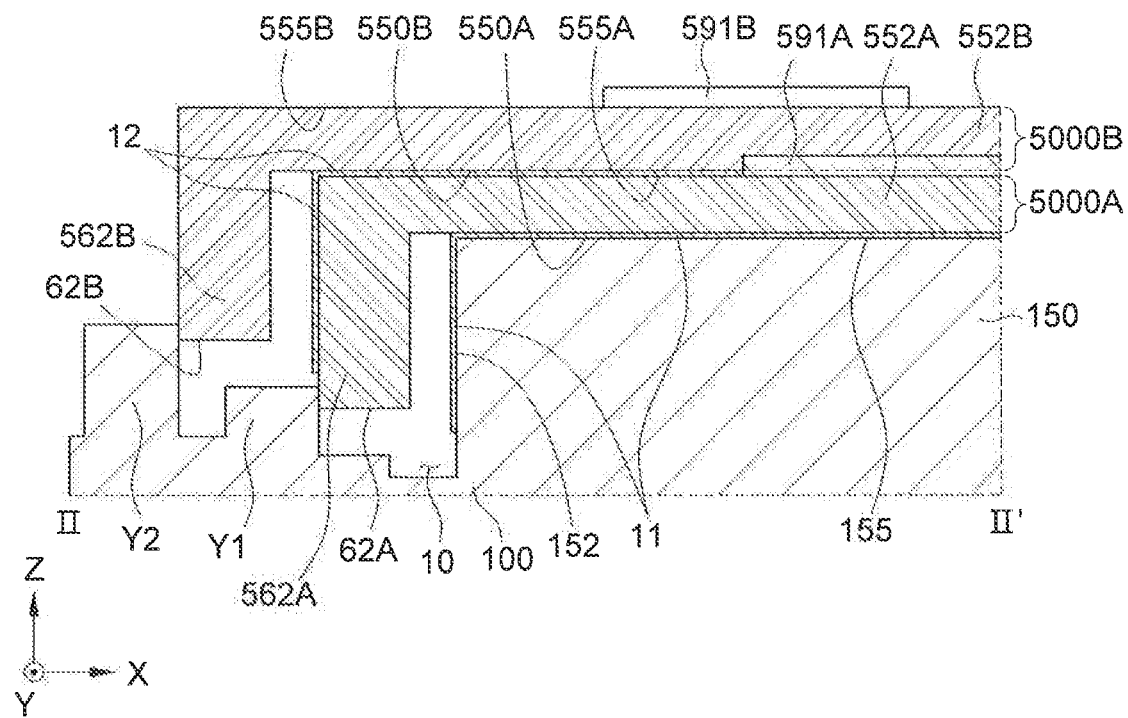
FIG. 5 is a sectional view taken along line II-II' of FIG. 3.

FIG. 2 is an exploded perspective view of a packing container for a display device according to an exemplary embodiment of the present invention, FIG. 3 is a plan view of a main tray 1000 shown in FIG. 2, FIG. 4 is a sectional view taken along line I-I' of FIG. 3, and FIG. 5 is a sectional view taken along line II-II' of FIG. 3. FIGS. 4 and 5 are sectional views showing a state in which a first sub-tray 5000A, a second sub-tray 5000B, a first display panel DP, and a second display panel DP have been coupled to the main tray 1000 of FIG. 3.

As shown in FIG. 2, the packing container for a display panel according to an exemplary embodiment of the present invention may include the main tray 1000, the first sub-tray 5000A, and the second sub-tray 5000B.

The main tray 1000 includes a base portion 100, a first panel support portion 150, a plurality of side portions 101, 102, 103 and 104, a plurality of base protruding portions X1, X2, Y1 and Y2, and a plurality of buffer portions 771, 772 and 773.

The base portion 100 may have a rectangular plate shape.

The plurality of side portions 101, 102, 103 and 104 may include a first side portion 101, a second side portion 102, a third side portion 103, and a fourth side portion 104.

The first side portion 101, the second side portion 102, the third side portion 103, and the fourth side portion 104 may each be located at a respective edge of the four edges of the base portion 100. The first to fourth side portions 101 to 104 protrude from respective edges of the base portion 100 in the Z-axis direction. The first to fourth side portions 101 to 104 may have the same thickness or height. The thicknesses or heights of the first to fourth side portions 101 to 104 refer to sizes which are measured in the Z-axis direction.

The first side portion 101, the second side portion 102, the third side portion 103, and the fourth side portion 104 are connected in such a manner that each two adjacent portions are connected to each other, and form a closed curve shape. For example, a structure formed by the first to fourth side portions 101 to 104 may form a rectangular closed curve shape. As an additional example, the first portion 101 is connected to the second side portion 102 and the fourth side portion 104, and the third side portion 103 is connected to the second side portion 102 and the fourth side portion 104.

The first side portion 101 is opposite to the third side portion 103. The first side portion 101 and the third side portion 103 may have substantially the same length. The length of the first side portion 101 and the length of the third side portion 103 refer to sizes which are measured in the X-axis direction.

The second side portion 102 is opposite to the fourth side portion 104. The second side portion 102 and the fourth side portion 104 may have substantially the same length. The length of the second side portion 102 and the length of the fourth side portion 104 refer to sizes which are measured in the Y-axis direction. The Y-axis has a direction intersecting the X-axis, and the Z-axis has a direction intersecting the X-Y plane.

The length of the second side portion 102 may be smaller than that of the first side portion 101. However, the preset invention is not limited thereto. For example, all the first to fourth side portions 101 to 104 may have the same length.

Each of the side portions 101 to 104 may include an outer side portion and an inner side portion. For example, the first side portion 101 may include a first inner side portion 101a, and a first outer side portion 101b located further from the center of the base portion 100 than the first inner side portion 101a. The second side portion 102 may include a second inner side portion 102a, and a second outer side portion 102b located further from the center of the base portion 100 than the second inner side portion 102a. The third side portion 103 may include a third inner side portion 103a, and a third outer side portion 103b located further from the center of the base portion 100 than the third inner side portion 103a. Furthermore, the fourth side portion 104 includes a fourth inner side portion 104a, and a fourth outer side portion 104b located further from the center of base portion 100 than the fourth inner side portion 104a. For example, the center of the base portion 100 may be the center of gravity of the base portion 100.

The outer and inner side portions of the same side portion may have different heights. For example, the height of the first inner side portion 101a may be larger than that of the first outer side portion 101b. The height of the second inner side portion 102a may be larger than that of the second outer side portion 102b. The height of the third inner side portion 103a may be larger than that of the third outer side portion 103b. Furthermore, the height of the fourth inner side portion 104a is larger than that of the fourth outer side portion 104b. The height of each outer side portion and the height of each inner side portion may refer to sizes which are measured from their corresponding edges of the base portion 100 in the Z-axis direction.

All the first to fourth inner side portions 101a to 104a may have substantially the same height.

All the first to fourth outer side portions 101b to 104b may have substantially the same height.

The first inner side portion 101a, the second inner side portion 102a, the third inner side portion 103a, and the fourth inner side portion 104a are connected in such a manner that each two adjacent portions are connected to each other, and form a closed shape. For example, a structure (hereinafter referred to as the "inner structure") formed by the first to fourth inner side portions 101a to 104a may form a rectangular closed curve shape. As an additional example, at least one corner of the closed shape may be curved. The first to fourth inner side portions 101a to 104a may be integrated with one another.

The first outer side portion 101b, the second outer side portion 102b, the third outer side portion 103b, and the fourth outer side portion 104b are connected in such a manner that each two adjacent portions are connected to each other, and form a closed shape. For example, a structure (hereinafter referred to as the "outer structure") formed by the first to fourth outer side portions 101b to 104b may form a rectangular closed curve shape. As an additional example, the closed shape of the outer structure may correspond to the closed shape of the inner structure. The first to fourth outer side portions 101b to 104b may be integrated with one another.

The outer structure surrounds the inner structure. The opposite surfaces of the outer structure and the inner structure come into contact with each other. For example, an outer surface of the inner structure may contact the inner surface of the outer structure. The height of the inner structure is larger than that of the inner structure. Accordingly, the inner structure and the outer structure have a difference in height.

Each of the first to fourth side portions 101 to 104 may have at least one depression 10. For example, each of the first to fourth inner side portions 101a to 104a of the first to fourth side portions 101 to 104 may have at least one depression 10. A desiccant may be inserted into the depression 10.

The first panel support portion 150 is located on the base portion 100. The first panel support portion 150 is surrounded by the above-described first to fourth side portions 101 to 104. The first panel support portion 150 protrudes from the base portion 100 in the Z-axis direction. The first panel support portion 150 may be integrated with the base portion 100.

The first panel support portion 150 is located off-center from the center of base portion 100 to the third side portion 103 and the fourth side portion 104. For example, the first panel support portion 150 is located closer to the third side portion 103 than to the first side portion 101, and the first panel support portion 150 is located closer to the fourth side portion 104 than to the second side portion 102.

For example, the first panel support portion 150 may have a rectangular plate shape.

The first side surface 151 of the first panel support portion 150 is opposite to the first side portion 101, the second side surface 152 of the first panel support portion 150 is opposite to the second side portion 102, the third side surface 153 of the first panel support portion 150 is opposite to the third side portion 103, and the fourth side surface 154 of the first panel support portion 150 is opposite to the fourth side portion 104.

The display panel DP is disposed on the top surface 155 of the first panel support portion 150. In other words, the top surface 155 of the first panel support portion 150 is a panel support surface. For example, as shown in FIGS. 4 and 5, the display panel DP of a first display device 11 is disposed on the top surface (panel support surface) 155 of the first panel support portion 150. In other words, the display panel DP of the first display device 11 is located between the first panel support portion 150 and the second panel support portion 552A of the first sub-tray 5000A.

As shown in FIG. 4, the top surface 155 of the first panel support portion 150 and the first side surface 151 of the first panel support portion 150 form an angle θ1 of about 90 degrees. Accordingly, the angle between the display panel DP supported by the top surface and the data driver DD supported by the first side surface 151 may be stably maintained at about 90 degrees. Accordingly, the display panel DP of the first display device 11 and the data driver DD may be prevented from being separated from each other. In addition, when the angle between the display panel DP and the data driver DD is not 90 degrees, the angle θ1 formed by the top surface 155 of the first panel support portion 150 and the first side surface 151 of the first panel support portion 150 may be changed to coincide with the angle between the display panel DP and the data driver DD.

As shown in FIG. 4, the first side surface 151 extends longer along the Z-axis than the combined widths of the data driver DD of the first display device 11 and the printed circuit board PCB.

The plurality of base protruding portions X1, X2, Y1 and Y2 include a plurality of horizontal protruding portions X1 and X2 and a plurality of vertical protruding portions Y1 and Y2 which are arranged in different directions.

The plurality of horizontal protruding portions X1 and X2 are located on the base portion 100. For example, the plurality of horizontal protruding portions X1 and X2 may be located between the first side surface 151 of the first panel support portion 150 and the first side portion 101 on the base portion 100. For example, as shown in FIG. 3, an imaginary line, which is in contact with the first side surface 151 and extends along the first side surface 151, may be denoted as a first line L1, and the plurality of horizontal protruding portions X1 and X2 may be located between the first line L1 and the first side portion 101.

The plurality of horizontal protruding portions X1 and X2 is located closer to the first side portion 101 than to the third side portion 103.

The plurality of horizontal protruding portions X1 and X2 may be sequentially arranged from the first side surface 151 (or first line L1) to the first side portion 101. However, the present invention is not limited thereto.

The plurality of horizontal protruding portions X1 and X2 have a bar or line shape which extends along the X-axis direction. The plurality of horizontal protruding portions X1 and X2 are parallel with the first side surface 151.

The plurality of horizontal protruding portions X1 and X2 are disposed in the Y-axis direction.

The horizontal protruding portions X1 and X2 are located at different distances from the first side surface 151 of the first panel support portion 150. These horizontal protruding portions X1 and X2 may have different lengths depending on the distances from the first side surface 151. In this case, the lengths of the horizontal protruding portions X1 and X2 refer to sizes which are measured in the X-axis direction. For example, one of the horizontal protruding portions X1 and X2 which is located further from the first side surface 151 has a larger length than the one located closer to the first side surface 151. As another example, as shown in FIG. 3, the length of the second horizontal protruding portion X2 is larger than that of the first horizontal protruding portion X1.

Furthermore, the horizontal protruding portions X1 and X2 have different heights depending on the distances from the first side surface 151. In this case, the heights of the horizontal protruding portions X1 and X2 refer to sizes which were measured in the Z-axis direction. For example, one of the horizontal protruding portions X1 and X2 which is located further from the first side surface 151 has a larger height than the one located closer to the first side surface 151. As another example, as shown in FIG. 4, the height of the second horizontal protruding portion X2 is larger than that of the first horizontal protruding portion X1.

The horizontal protruding portions X1 and X2 are opposite to the first side surface 151. For example, as shown in FIG. 4, the inner surface of the first horizontal protruding portion X1 is opposite to the first side surface 151, and part of the inner surface of the second horizontal protruding portion X2 is opposite to the first side surface 151. For example, part of the second horizontal protruding portion X2 overlaps the first side surface 151 along the Y-axis and another part of the second horizontal protruding portion X2 does not overlap the first side surface 151 along the Y-axis. In this case, the inner surface of the second horizontal protruding portion X2, except for the part not overlapping the first side surface 151, is opposite to the outer surface of the first horizontal protruding portion X1. In this case, the inner and outer surfaces of each horizontal protruding portion refer surfaces which are opposite to each other in the Y-axis direction. The inner one of the inner and outer surfaces included in the horizontal protruding portion (e.g., X1 and X2) is located closer to the first side surface 151.

One of the horizontal protruding portions X1 and X2 which is closer to the first side surface 151 may have substantially the same length as the first side surface 151. In this case, the length of the first side surface 151 refers to a size which is measured in the X-axis direction.

The horizontal protruding portions X1 and X2 may have a smaller height than that of the first panel support portion 150. For example, the largest horizontal protruding portion may have a smaller height than the first panel support portion 150. As another example, the height of the second horizontal protruding portion X2 may be smaller than that of the first panel support portion 150.

The plurality of vertical protruding portions Y1 and Y2 are located on the base portion 100. For example, the plurality of vertical protruding portions Y1 and Y2 may be located between the second side surface 152 of the first panel support portion 150 and the second side portion 102 of the base portion 100. For example, as shown in FIG. 3, an imaginary line, which is in contact with the second side surface 152 and which extends along the second side surface 152, may be denoted as a second line L2, and the plurality of vertical protruding portions Y1 and Y2 may be located between the second line L2 and the second side portion 102.

The plurality of vertical protruding portions Y1 and Y2 are located closer to the second side portion 102 than to the fourth side portion 104.

The plurality of vertical protruding portions Y1 and Y2 may be sequentially arranged from the second side surface 152 (or second line L2) to the second side portion 102. In other words, the vertical protruding portions Y1 and Y2 may be sequentially arranged in a direction opposite to the X-axis direction (e.g., the negative X-axis direction). However, the present invention is not limited thereto.

The plurality of vertical protruding portions Y1 and Y2 have a bar or line shape which extends along the Y-axis direction. The plurality of vertical protruding portions Y1 and Y2 are parallel to the second side surface 152.

The plurality of vertical protruding portions Y1 and Y2 are disposed in the X-axis direction.

The extension directions of the plurality of vertical protruding portions Y1 and Y2 intersect the extension directions of the plurality of horizontal protruding portions X1 and X2. In other words, the vertical protruding portions Y1 and Y2 may extend along the Y-axis direction.

The vertical protruding portions Y1 and Y2 are located at different distances from the second side surface 152 of the first panel support portion 150. These vertical protruding portions Y1 and Y2 have different lengths depending on the distances from the second side surface 152. In this case, the lengths of the vertical protruding portions Y1 and Y2 refer to sizes which are measured in the Y-axis direction. For example, one of the vertical protruding portions Y1 and Y2 which is located further from the second side surface 152 has a larger length than the one located closer to the second side surface 152. As an additional example, as shown in FIG. 3, the length of the second vertical protruding portion Y2 is larger than that of the first vertical protruding portion Y1.

Furthermore, the vertical protruding portions Y1 and Y2 have different heights depending on the distances from the second side surface 152. In this case, the heights of the vertical protruding portions Y1 and Y2 refer to sizes which are measured in the Z-axis direction. For example, one of the vertical protruding portions Y1 and Y2 which is located further from the second side surface 152 has a larger height than the one located closer to the second side surface 152. As another example, as shown in FIG. 5, the height of the second vertical protruding portion Y2 is larger than that of the first vertical protruding portion Y1.

The vertical protruding portions Y1 and Y2 are opposite to the second side surface 152. For example, as shown in FIG. 5, the inner surface of the first vertical protruding portion Y1 is opposite to the second side surface 152, and part of the inner surface of the second vertical protruding portion Y2 is opposite to the second side surface 152. For example, part of the second vertical protruding portion Y2 overlaps the second side surface 152 along the X-axis and another part of the second vertical protruding portion Y2 does not overlap the second side surface 152 along the X-axis. In this case, the inner surface of the second vertical protruding portion Y2 except for the part not overlapping the second side surface 152, is opposite to the outer surface of the first vertical protruding portion Y1. In this case, the inner and outer surfaces of each vertical protruding portion refer to surfaces which are opposite to each other in the X-axis direction. The inner one of the inner and outer surfaces included in the vertical protruding portion (e.g., Y1 and Y2) is located closer to the second side surface 152.

One of the vertical protruding portions Y1, Y2 which is closer to the second side surface 152 may have substantially the same length as the second side surface 152. In this case, the length of the second side surface 152 refers to a size which is measured in the Y-axis direction.

The vertical protruding portions Y1 and Y2 may have a smaller height than that of the first panel support portion 150. For example, the larger vertical protruding portion may have a smaller height than the first panel support portion 150. As another example, the height of the second vertical protruding portion Y2 may be smaller than that of the first panel support portion 150.

As shown in FIG. 2, the first sub-tray 5000A includes the second panel support portion 552A, a first lower protruding portion 561A, a second lower protruding portion 562A, a first upper protruding portion 591A, and a second upper protruding portion 592A.

The first sub-tray 5000A may be coupled to the main tray 1000. The first sub-tray 5000A coupled to the main tray 1000 is located inside the main tray 1000. For example, the first sub-tray 5000A is located inside a space which is surrounded by the first to fourth side portions 101 to 104 of the main tray 1000.

The first sub-tray 5000A is separably coupled to the main tray 1000. In other words, the first sub-tray 5000A may be coupled to and separated from the main tray 1000. For example, the first sub-tray 5000A may be a separate element from the main tray 1000 but may be coupled or attached to the main tray 1000.

The configuration of the first sub-tray 5000A coupled to the main tray 1000 will be described in detail below.

As shown in FIG. 2, the second panel support portion 552A of the first sub-tray 5000A is located on the first panel support portion 150 of the main tray 1000.

The first lower protruding portion 561A of the first sub-tray 5000A protrudes from the second panel support portion 552A in the direction (hereinafter referred to as the "−Z-axis direction") opposite to the +Z-axis direction. For example, the first lower protruding portion 561A may protrude from the bottom surface 550A of the second panel support portion 552A toward the base portion 100. As another example, the first lower protruding portion 561A may protrude from the first edge of the bottom surface 550A toward the base portion 100. For example, the first lower protruding portion 561A and the second panel support portion 552A may form an angle of about 90 degrees. In this case, the bottom surface 550A of the second panel support portion 552A is a surface which is opposite to the top surface 155 (panel support surface) of the first panel support portion 150. The first edge of the second panel support portion 552A is located to correspond to the first side surface 151 of the first panel support portion 150.

As shown in FIG. 4, at least part of the first lower protruding portion 561A may be located between the first side surface 151 of the first panel support portion 150 and the first horizontal protruding portion X1. For example, the first lower protruding portion 561A may have a lower surface that is an end portion 61A of the first lower protruding portion 561A. The end portion 61A may be located between the first side surface 151 and the first horizontal protruding portion X1. In an addition, the end portion 61A may be opposite an upper surface of the base portion 100.

The first lower protruding portion 561A is spaced apart from the base portion 100 by a predetermined interval d1. For example, the opposite surfaces of the first lower protruding portion 561A and the base portion 100 are spaced apart from each other by the predetermined interval d1. In other words, the end portion 61A of the first lower protruding portion 561A is spaced apart from the base portion 100 by the predetermined interval d1.

The first lower protruding portion 561A is spaced apart from the first side surface 151 by a predetermined interval d2. For example, the opposite surfaces of the first lower protruding portion 561A and the first side surface 151 are spaced apart from each other by the predetermined interval d2. As an additional example, an inner surface of the first lower protruding portion 561A is opposite to the first side surface 151, and is spaced apart from the first side surface 151 by the predetermined interval d2.

The data driver DD and printed circuit board PCB of the first display device 11 are located between the first side surface 151 and the first lower protruding portion 561A. The data driver DD and printed circuit board PCB of the first display device 11 may come into contact with the first side surface 151. In addition, the data driver DI) and printed circuit board PCB of the first display device 11 do not come into contact with the first lower protruding portion 561A which is opposite to the data driver DD and the printed circuit board PCB.

The interval d2 between the first side surface 151 and the first lower protruding portion 561A is larger than the thickness of the data driver DD. Furthermore, the interval d2 between the first side surface 151 and the first lower protruding portion 561A is larger than the thickness of the printed circuit board PCB.

The display panel DP of the second display device 12 is located on the top surface (panel support surface) 555A of the second panel support portion 552A. For example, the display panel DP of the second display device 12 is located between the second panel support portion 552A and the third panel support portion 552B of the second sub-tray 5000B. Furthermore, the data driver DD and printed circuit board PCB of the second display device 12 come into contact with the outer surface of the first lower protruding portion 561A. In this case, the inner and outer surfaces of the first lower protruding portion 561A refer to opposite surfaces in the Y-axis direction. As shown in FIG. 4, the outer surface of the first lower protruding portion 561A is located further from the first side surface 151 than the inner surface thereof.

As shown in FIG. 4, the second panel support portion 552A and the first lower protruding portion 561A of the second panel support portion 552A may form an angle θ2 of about 90 degrees. For example, the top surface 555A of the second panel support portion 552A and the outer surface of the first lower protruding portion 561A may form an angle θ2 of 90 degrees. Accordingly, the display panel DP supported by the top surface 555A of the second panel support portion 552A and the data driver DD supported by the outer surface of the first lower protruding portion 561A may form an angle of about 90 degrees. Accordingly, the display panel DP and data driver DD of the second display device 12 may be prevented from being separated from each other. In addition, when the angle between the display panel DP and the data driver DD is not 90 degrees, the angle θ2 formed by the top surface 555A of the second panel support portion 552A and the first lower protruding portion 561A of the second panel support portion 552A may be changed to coincide with the angle between the display panel DP and the data driver DD.

As shown in FIG. 4, the first lower protruding portion 561A protruding from the first edge of the second panel support portion 552A comes into contact with the first horizontal protruding portion X1. The first lower protruding portion 561A is restrained from being moved in the Y-axis direction by the first horizontal protruding portion X1. In other words, the first horizontal protruding portion X1 prevents the first lower protruding portion 561A from being moved in the Y-axis direction. Accordingly, the first sub-tray 5000A including the first lower protruding portion 561A may be prevented from being moved in the Y-axis direction.

Another edge of the second panel support portion 552A opposite to the first edge of the above-described second panel support portion 552A may be a third edge. The third edge may come into contact with the third side portion 103 of the main tray 1000. Accordingly, the first sub-tray 5000A including the third edge may be prevented from being moved in a direction (the −Y-axis direction) opposite to the +Y-axis direction.

As described above, the first sub-tray 5000A is located between the first horizontal protruding portion X1 and the third side portion 103 in close contact with them. Accordingly, the first sub-tray 5000A may be prevented from being moved in the +Y-axis direction or in the −Y-axis direction.

As shown in FIG. 2, the second lower protruding portion 562A of the first sub-tray 5000A protrudes from the second panel support portion 552A in the −Z-axis direction. For example, the second lower protruding portion 562A may protrude from the bottom surface 550A of the second panel support portion 552A toward the base portion 100. As an additional example, the second lower protruding portion 562A may protrude from the second edge of the bottom surface 550A toward the base portion 100. In this case, the second edge of the second panel support portion 552A is located to correspond to the second side surface 152 of the first panel support portion 150. For example, the second edge of the second panel support portion 552A may be adjacent to the second side surface 152 of the first panel support portion 150.

As shown in FIG. 5, at least part of the second lower protruding portion 562A may be located between the second side surface 152 of the first panel support portion 150 and the first vertical protruding portion Y1. For example, the second lower protruding portion 562A may have a lower surface that is an end portion 62A of the second lower protruding portion 562A. The end portion 62A may be located between the second side surface 152 and the first vertical protruding portion Y1. In an addition, the end portion 62A may be opposite an upper surface of the base portion 100.

The second lower protruding portion 562A is spaced apart from the base portion 100 by a predetermined interval. For example, the opposite surfaces of the second lower protruding portion 562A and the base portion 100 are spaced apart from each other by a predetermined interval. In other words, the end portion 62A of the second lower protruding portion 562A is spaced apart from the base portion 100 by a predetermined interval.

The second lower protruding portion 562A is spaced apart from the second side surface 152 by a predetermined interval. For example, the opposite surfaces of the second lower protruding portion 562A and the second side surface 152 are spaced apart from each other by a predetermined interval. As an additional example, an inner surface of the second lower protruding portion 562A is opposite to the second side surface 152, and is spaced apart from the second side surface 152 by the predetermined interval.

The gate driver GD of the first display device 11 is located between the second side surface 152 and the second lower protruding portion 562A. The gate driver GD of the first display device 11 may come into contact with the second side surface 152. In addition, the gate driver GD of the first display device 11 does not come into contact with the second lower protruding portion 562A.

The second side surface 152 longer along the Z-axis direction than the gate driver GD of the first display device 11.

The interval between the second side surface 152 and the second lower protruding portion 562A is larger than the thickness of the gate driver GD.

The display panel DP of the second display device 12 is located on the top surface (panel support surface) 555A of the second panel support portion 552A.

The gate driver GD of the second display device 12 comes into contact with the outer surface of the second lower protruding portion 562A. In this case, the inner and outer surfaces of the second lower protruding portion 562A refer to surfaces opposite to each other in the X-axis direction. The outer surface of the second lower protruding portion 562A is located further from the second side surface 152 than the inner surface thereof.

The second panel support portion 552A and the second lower protruding portion 562A of the second panel support portion 552A may form an angel of about 90 degrees. For example, the top surface 555A of the second panel support portion 552A and the outer surface of the second lower protruding portion 562A may form an angle of about 90 degrees. Accordingly, the display panel DP supported by the top surface 555A of the second panel support portion 552A and the gate driver GD supported by the outer surface of the second lower protruding portion 562A may form an angle of about 90 degrees. Accordingly, the display panel DP and gate driver GD of the second display device 12 may be prevented from being separated from each other. In addition, when the angle between the display panel DP and the gate driver GD is not 90 degrees, an angle formed by the top surface 555A of the second panel support portion 552A and the second lower protruding portion 562A of the second panel support portion 552A may be changed to coincide with the angle between the display panel DP and the gate driver GD.

As shown in FIG. 5, the second lower protruding portion 562A protruding from the second edge of the second panel support portion 552A comes into contact with the first vertical protruding portion Y1. The second lower protruding portion 562A is restrained from being moved in the direction (hereinafter referred to as the "–X-axis direction) opposite to the X-axis direction by the first vertical protruding portion Y1. In other words, the first vertical protruding portion Y1 prevents the second lower protruding portion 562A from being moved in the –X-axis direction. Accordingly, the first sub-tray 5000A including the second lower protruding portion 562A is prevented from being moved in the –X-axis direction.

Another edge of the second panel support portion 552A opposite to the second edge of the above-described second panel support portion 552A may be a fourth edge. The fourth edge may come into contact with the fourth side portion 104 of the main tray 1000. Accordingly, the first sub-tray 5000A including the fourth edge may be prevented from being moved in the X-axis direction.

As described above, the first sub-tray 5000A is located between the first vertical protruding portion Y1 and the fourth side portion 104 in close contact with them. Accordingly, the first sub-tray 5000A may be prevented from being moved in the X-axis direction or the –X-axis direction.

As a result, the first horizontal protruding portion X1, the first vertical protruding portion Y1 and the third and fourth side portions 103 and 104 may prevent the first sub-tray 5000A from being moved.

The first upper protruding portion 591A of the first sub-tray 5000A protrudes from the second panel support portion 552A in the Z-axis direction. For example, the first upper protruding portion 591A may protrude from the third edge of the top surface 555A in the direction opposite to the protruding direction of the first lower protruding portion 562A. In this case, the third edge of the second panel support portion 552A is located to correspond to the third side surface 153 of the first panel support portion 150. For example, the third edge is located adjacent to the third side surface 153 of the first panel support portion 150. Furthermore, the third edge of the second panel support portion 552A is opposite to the first edge of the second panel support portion 552A.

FIG. 2 shows two first upper protruding portions 591A as an example. One of the first upper protruding portions 591A is located closer to the second lower protruding portion 562A of the second panel support portion 552A, and the other first upper protruding portion 591A is located closer to the contact (i.e., vertex) of the third and fourth edges of the second panel support portion 552A. In addition, even though FIG. 2 shows two first upper protruding portions 591A, the present invention is not limited thereto.

The plurality of first upper protruding portions 591A may be located along the third edge of the second panel support portion 552A.

As shown in FIG. 5, the first upper protruding portion 591A of the first sub-tray 5000A may come into contact with the third panel support portion 552B of the second sub-tray 5000B. In this case, the first upper protruding portion 591A may be located between the third panel support portion 552B and the third side portion 103 of the first panel support portion 150.

As shown in FIG. 2, the second upper protruding portion 592A of the first sub-tray 5000A protrudes from the second panel support portion 552A in the Z-axis direction. For example, the second upper protruding portion 592A may protrude from the fourth edge of the top surface 555A in the direction opposite to the protruding direction of the first lower protruding portion 561A. In this case, the fourth edge of the second panel support portion 552A is located to correspond to the fourth side surface 154 of the first panel support portion 150. For example, the fourth edge of the second panel support portion 552A is located adjacent to the fourth side surface 154. Furthermore, the fourth edge of the second panel support portion 552A is opposite to the second edge of the second panel support portion 552A.

FIG. 2 shows two second upper protruding portions 592A as an example. One of the second upper protruding portions 592A is located closer to the first lower protruding portion 561A of the second panel support portion 552A, and the other second upper protruding portion 592A is located closer to the contact (i.e., vertex) of the third and fourth edges of the second panel support portion 552A.

The second upper protruding portions 592A may be located along the fourth edge of the second panel support portion 552A.

As shown in FIG. 4, the second upper protruding portion 592A may come into contact with the third panel support portion 552B of the second sub-tray 5000B. In this case, the second upper protruding portion 592A may be located between the third panel support portion 552B and the fourth side portion 104.

As shown in FIG. 2, the second sub-tray 5000B includes the third panel support portion 552B, a first lower protruding portion 561B, a second lower protruding portion 562B, a first upper protruding portion 591B, and a second upper protruding portion 592B.

The second sub-tray 5000B may be coupled to the main tray 1000 and the first sub-tray 5000A. The second sub-tray 5000B coupled to the main tray 1000 and the first sub-tray 5000A may be located inside the main tray 1000. For example, the second sub-tray 5000B is located inside a space surrounded by the first to fourth side portions 101 to 104 of the main tray 1000.

The second sub-tray 5000B is separably coupled to the main tray 1000 and the first sub-tray 5000A. In other words, the second sub-tray 5000B may be coupled to and separated from the main tray 1000 and the first sub-tray 5000A. For example, the second sub-tray 5000B may be a separate element from the main tray 1000 but may be coupled or attached to the main tray 1000.

The configuration of the second sub-tray 5000B coupled to the main tray 1000 and the first sub-tray 5000A will be described in detail below with reference to FIGS. 2 to 6.

Figure 6:
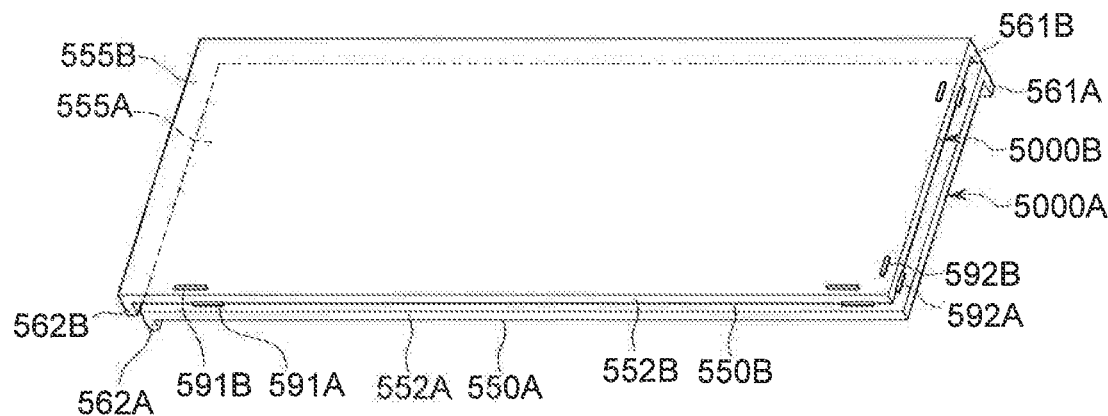
FIG. 6 is a view illustrating a method of coupling a first sub-tray and a second sub-tray to each other according to an exemplary embodiment of the present invention.

FIG. 6 is a view illustrating a method of coupling the first sub-tray 5000A and the second sub-tray 5000B to each other according to an exemplary embodiment of the present invention.

The third panel support portion 552B of the second sub-tray 5000B is located on the second panel support portion 552A of the first sub-tray 5000A.

As shown in FIG. 2, the first lower protruding portion 561B of the second sub-tray 5000B protrudes from the third panel support portion 552B in the −Z-axis direction. For example, the first lower protruding portion 561B may protrude from the bottom surface 550B of the third panel support portion 552B toward the base portion 100. As an additional example, the first lower protruding portion 561B may protrude from the first edge of the bottom surface 550B toward the base portion 100. In this case, the bottom surface 550B of the third panel support portion 552B is a surface which is opposite to the top surface 555A (i.e., panel support surface) of the second panel support portion 552A. The first edge of the third panel support portion 552B is located to correspond to the first edge of the second panel support portion 552A. For example, the first edge of the third panel support portion 552B is located adjacent to the first edge of the second panel support portion 552A.

As shown in FIG. 4, at least part of the first lower protruding portion 561B of the second sub-tray 5000B may be located between the first lower protruding portion 561A of the first sub-tray 5000A and the second horizontal protruding portion X2. For example, the first lower protruding portion 561B may have a lower surface that is an end portion 61B of the first lower protruding portion 561B. The end portion 61B may be located between the first lower protruding portion 561A of the first sub-tray 5000A and the second horizontal protruding portion X2. In addition, the end portion 61B may be opposite an upper surface of the base portion 100.

As shown in FIG. 4, the first lower protruding portion 561B of the second sub-tray 5000B is spaced apart from the base portion 100 by a predetermined interval. For example, the opposite surfaces of the first lower protruding portion 561B and the base portion 100 are spaced apart from each other by a predetermined interval. In other words, the end portion 61B of the first lower protruding portion 561B is spaced apart from the base portion 100 by a predetermined interval. Furthermore, the end portion 61B of the first lower protruding portion 561B is opposite to the first horizontal protruding portion X1. For example, the end portion 61B at least partially overlaps the first horizontal protruding portion X1. The end portion 61B is spaced apart from the first horizontal protruding portion X1 by a predetermined interval.

The first lower protruding portion 561B of the second sub-tray 5000B is spaced apart from the first lower protruding portion 561A of the first sub-tray 5000A by a predetermined interval. For example, the opposite surfaces of the adjacent first lower protruding portions 561A and 561B are spaced apart from each other by a predetermined interval.

The data driver DD and printed circuit board PCB of the second display device 12 are located between the adjacent first lower protruding portions 561A and 561B. The data driver DD and printed circuit board PCB of the second display device 12 do not come into contact with the first lower protruding portion 561A of the second sub-tray 5000B.

The interval between the adjacent first lower protruding portions 561A and 561B is larger than the thickness of the data driver DD. Furthermore, the interval between the adjacent first lower protruding portions 561A and 561B is larger than the thickness of the printed circuit board PCB.

Although not shown in the drawing, the display panel of the third display device may be located on the top surface panel (support portion) 555B of the third panel support portion 552B.

The third panel support portion 552B and the first lower protruding portion 561A protruding from the third panel support portion 552B form an angle of about 90 degrees. For example, the top surface 555B of the third panel support portion 552B and the outer surface of the first lower protruding portion 561B form an angle of about 90 degrees. In addition, when the angle between the display panel DP and the data driver DD is not 90 degrees, the top surface 555B of the third panel support portion 552B and the first lower protruding portion 561B of the third panel support portion 552B may be changed to coincide with the angle between the display panel and the data driver.

As shown in FIG. 4, the first lower protruding portion 561B protruding from the first edge of the third panel support portion 552B comes into contact with the second horizontal protruding portion X2. The second horizontal protruding portion X2 may restrain the first lower protruding portion 561B from being moved in the Y-axis direction. In other words, the second horizontal protruding portion X2 prevents the first lower protruding portion 561B from being moved in the Y-axis direction. Accordingly, the second sub-tray 5000B including the first lower protruding portion 561B1 may be prevented from being moved in the Y-axis direction.

Another edge of the third panel support portion 552B opposite to the first edge of the above-described third panel support portion 552B may be a third edge. The third edge may come into contact with the first upper protruding portion 591A of the first sub-tray 5000A, as shown in FIG. 6. Accordingly, the second sub-tray 5000B including the third edge may be prevented from being moved in the −Y-axis direction.

As described above, the second sub-tray 5000B is located between the second horizontal protruding portion X2 of the main tray 1000 and the first upper protruding portion 591A of the first sub-tray 5000A in close contact with them. Accordingly, the second sub-tray 5000B may be prevented from being moved in the +Y-axis direction or the −Y-axis direction.

As shown in FIG. 2, the second lower protruding portion 562B of the second sub-tray 5000B protrudes from the third panel support portion 552B in the −Z-axis direction. For example, the second lower protruding portion 562B may protrude from the bottom surface 550B of the third panel support portion 552B toward the base portion 100. As an additional example, the second lower protruding portion 562B may protrude from the second edge of the bottom surface 550B toward the base portion 100. In this case, the second edge of the third panel support portion 552B is located to correspond to the second edge of the second panel support portion 552A. For example, the second edge of the third panel support portion 552B may be adjacent to the second edge of the second panel support portion 552A.

As shown in FIG. 5, at least part of the second lower protruding portion 562B of the second sub-tray 5000B may be located between the second lower protruding portion 562A of the first sub-tray 5000A and the second vertical protruding portion Y2. For example, the second lower protruding portion 562B may have a lower surface that is an end portion 62B of the second lower protruding portion 562B. The end portion 62B may be located between the second lower protruding portion 562A of the first sub-tray 5000A and the second vertical protruding portion Y2. In an addition, the end portion 62B may be opposite an upper surface of the base portion 100.

The second lower protruding portion 562B of the second sub-tray 5000B is spaced apart from the base portion 100 by a predetermined interval. For example, the opposite surfaces of the second lower protruding portion 562B and the base portion 100 are spaced apart from each other by a predetermined interval. In other words, the end portion 62B of the second lower protruding portion 562B is spaced apart from base portion 100 by a predetermined interval. Furthermore, the end portion 62B of the second lower protruding portion 562B is opposite to the first vertical protruding portion Y1. For example, the end portion 62B at least partially overlaps the first vertical protruding portion Y1. The end portion 62B is spaced apart from the first vertical protruding portion Y1 by a predetermined interval.

The second lower protruding portion 562B of the second sub-tray 5000B is spaced apart from the second lower protruding portion 562A of the first sub-tray 5000A by a predetermined interval. For example, the opposite surfaces of the adjacent second lower protruding portions 562A and 562B are spaced apart from each other by a predetermined interval.

The gate driver GD of the second display device 12 is located between the adjacent second lower protruding portions 562A and 562B. The gate driver GD of the second display device 12 does not come into contact with the second lower protruding portion 562B of the second sub-tray 5000B.

The interval between the adjacent second lower protruding portions 562A and 562B is larger than the thickness of the gate driver GD.

The third panel support portion 552B and the second lower protruding portion 562B protruding from the third panel support portion 552B may form an angle of about 90 degrees. For example, the top surface 555B of the third panel support portion 552B and the outer surface of the second lower protruding portion 562B may form an angle of 90 about degrees. In addition, when the angle between the display panel and the gate driver is not 90 degrees, an angle formed by the top surface 555B of the third panel support portion 552B and the second lower protruding portion 562B of the third panel support portion 552B may be changed to coincide with the angle between the display panel and the gate driver.

As shown in FIG. 5, the second lower protruding portion 562B protruding from the second edge of the third panel support portion 552B comes into contact with the second vertical protruding portion Y2. The second vertical protruding portion Y2 may restrain the second lower protruding portion 562B from being moved in the −X-axis direction. In other words, the second vertical protruding portion Y2 prevents the second lower protruding portion 562B from being moved in the −X-axis direction. Accordingly, the second sub-tray 5000B including the second lower protruding portion 562B may be prevented from being moved in the −X-axis direction.

Another edge of the third panel support portion 552B opposite to the second edge of the above-described third panel support portion 552B may be a fourth edge. The fourth edge may come into contact with the second upper protruding portion 592A of the first sub-tray 5000A, as shown in FIG. 6. Accordingly, the second sub-tray 5000B including the fourth edge may be prevented from being moved in the X-axis direction.

As described above, the second sub-tray 5000B is located between the second vertical protruding portion Y2 of the main tray 1000 and the second upper protruding portion 592A of the first sub-tray 5000A in close contact with them. Accordingly, the second sub-tray 5000B can be prevented from being moved in the −X-axis direction or +X-axis direction.

As a result, the second horizontal protruding portion X2, the second vertical protruding portion Y2, the first upper protruding portion 591A of the first sub-tray 5000A, and the second upper protruding portion 592A of the first sub-tray 5000A may prevent the second sub-tray 5000B from being moved.

As shown in FIG. 2, the first upper protruding portion 591B of the second sub-tray 5000B protrudes from the third panel support portion 552B in the Z-axis direction. For example, the first upper protruding portion 591B may protrude from the third edge of the top surface 555B in the direction opposite to the protruding direction of the first lower protruding portion 562B.

In this case, the third edge of the third panel support portion 552B is located to correspond to the third edge of the second panel support portion 552A. Furthermore, the third edge of the third panel support portion 552B is opposite to the first edge of the third panel support portion 552B.

FIG. 2 shows two first upper protruding portions 591B as an example. One of the first upper protruding portions 591B is located closer to the second lower protruding portion 562B of the third panel support portion 552B, and the other first upper protruding portion 591B is located closer to the contact (i.e., vertex) of the third and fourth edges of the third panel support portion 552B.

The first upper protruding portions 591B may be located along the third edge of the third panel support portion 552B.

Although not shown in the drawing, the first upper protruding portion 591B may come into contact with the fourth panel support portion of the third sub-tray. In this case, the first upper protruding portion 591B may be located between the fourth panel support portion and the third side portion 103 of the first panel support portion 150. In this case, the third sub-tray may have the same shape as the second sub-tray 5000B. The third sub-tray may be located on the second sub-tray 5000B.

The second upper protruding portion 592B of the second sub-tray 5000B protrudes from the third panel support portion 552B in the Z-axis direction. For example, the second upper protruding portion 592B may protrude from the fourth edge of the top surface 555B in the direction opposite to the protruding direction of the first lower protruding portion 562B. In this case, the fourth edge of the third panel support portion 552B is located to correspond to the fourth edge of the second panel support portion 552A. Furthermore, the fourth edge of the third panel support portion 552B is opposite to the second edge of the third panel support portion 552B.

FIG. 2 shows two second upper protruding portions 592B as an example. One of the second upper protruding portions 592B is located closer to the first lower protruding portion 561B of the third panel support portion 552B, and the other second upper protruding portion 592B is located closer to the contact (i.e., vertex) of the third and fourth edges of the third panel support portion 552B.

The second upper protruding portions 592B are located along the fourth edge of the third panel support portion 552B.

Although not shown in the drawing, the second upper protruding portion 592B may come into contact with the fourth panel support portion of the third sub-tray. In this case, the second upper protruding portion 592B is located between the fourth panel support portion and the fourth side portion 104.

As shown in FIG. 3, the first buffer portion 771 of the main tray 1000 is located between the outermost horizontal protruding portion (for example, second horizontal protruding portion X2) and the first side portion 101, and the second buffer portion 772 of the main tray 1000 is located between the outermost vertical protruding portion (for example, second vertical protruding portion Y2) and the second side portion 102. Furthermore, the third buffer portion 773 of the main tray 1000 is located inside a region surrounded by the adjacent edges, e.g., first side portion 101 and second side portion 102, of the first buffer portion 771 and the second buffer portion 772.

One of the plurality of sub-trays 5000A and 5000B which is located further from the first panel support portion 150 of the main tray 1000 is located closer to the first side portion 101 and second side portion 102 of the main tray 1000. For example, when one of the plurality of sub-trays 5000A and 5000B is closer to a top, the first lower protruding portion 561A or 561B of the corresponding sub-tray 5000A or 5000B is located closer to the first side portion 101, and the second lower protruding portion 562A or 562B thereof is located closer to the second side portion 102.

As the number of sub-trays increases, the above-described first to third buffer portions 771 to 773 have smaller areas.

Figure 7:
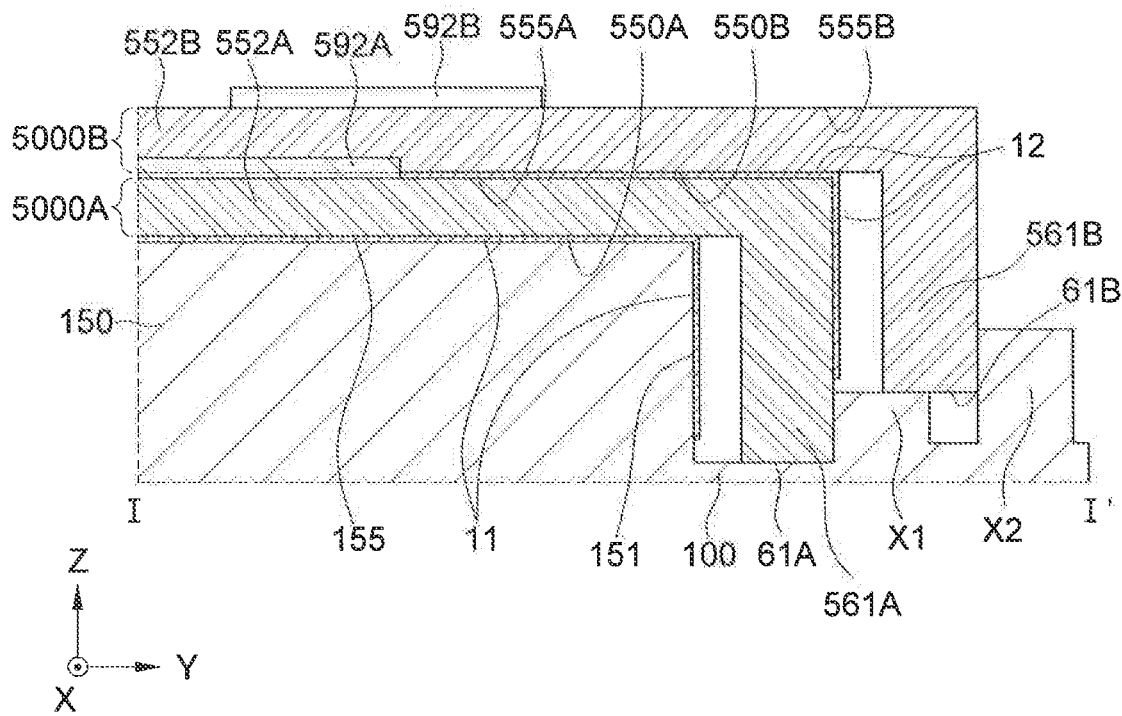
FIG. 7 is a sectional view taken along line I-I' of FIG. 3.
Figure 8:
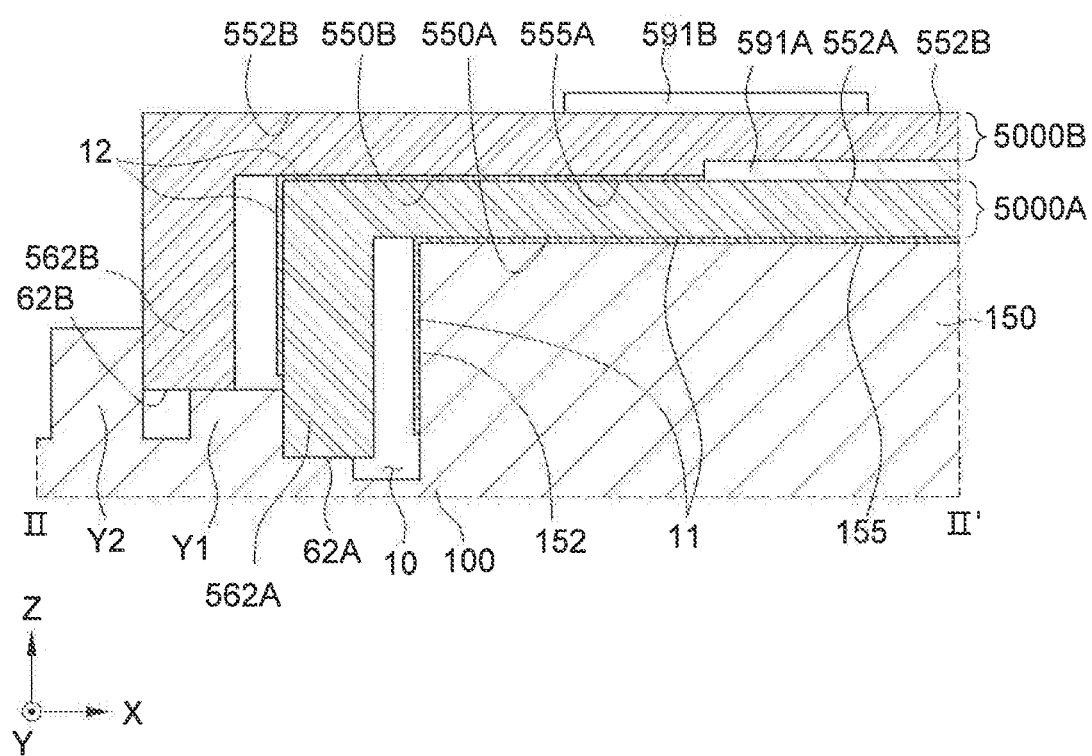
FIG. 8 is a sectional view taken along line II-II' of FIG. 3.

FIG. 7 is a sectional view taken along line I-I' of FIG. 3, and FIG. 8 is a sectional view taken along line II-II' of FIG. 3. In this case, FIGS. 7 and 8 are sectional views showing a state in which the first sub-tray 5000A, the second sub-tray 5000B, the first display panel DP, and the second display panel DP have been coupled to the main tray 1000 of FIG. 3.

As shown in FIG. 7, the first lower protruding portion 561A of the first sub-tray 5000A may come into contact with the base portion 100 which is opposite to the first lower protruding portion 561A. For example, the first lower protruding portion 561A may extend further toward the base portion 100, and may come into contact with the base portion 100. In this case, the end portion 61A of the first lower protruding portion 561A may come into contact with the base portion 100.

As shown in FIG. 8, the second lower protruding portion 562A of the first sub-tray 5000A may come into contact with the base portion 100 which is opposite to the second lower protruding portion 562A. For example, the second lower protruding portion 562A may extend further toward the base portion 100, and may come into contact with the base portion 100. In this case, the end portion 62A of the second lower protruding portion 562A may come into contact with the base portion 100.

As shown in FIG. 7, the first lower protruding portion 561B of the second sub-tray 5000B may come into contact with the first horizontal protruding portion X1 of the first lower protruding portion 561B. For example, the first lower protruding portion 561B may extend further toward the first horizontal protruding portion X1, and may come into contact with the first horizontal protruding portion X1. In this case, the end portion 61B of the first lower protruding portion 561B comes into contact with the first horizontal protruding portion X1. For example, the end portion 61B of the first lower protruding portion 561B may come into contact with an upper surface of the first horizontal protruding portion X1.

As shown in FIG. 8, the second lower protruding portion 562B of the second sub-tray 5000B may come into contact with the first vertical protruding portion Y1 which is opposite to the second lower protruding portion 562B. For example, the second lower protruding portion 562B may extend toward the first vertical protruding portion Y1, and may come into contact with the first vertical protruding portion Y1. In this case, the end portion 62B of the second lower protruding portion 562B may come into contact with the first vertical protruding portion Y1. For example, the end portion 62B of the second lower protruding portion 562B may come into contact with an upper surface of the first vertical protruding portion Y1.

When the lower protruding portions of the sub-trays 5000A and 5000B come into contact with the base portion 100 or protruding portions (horizontal protruding portions or vertical protruding portions X1, X2, Y1 or Y2), as shown in FIGS. 7 and 8, the support force of the sub-trays 5000A and 5000B used to support a display device may be increased.

Figure 9:
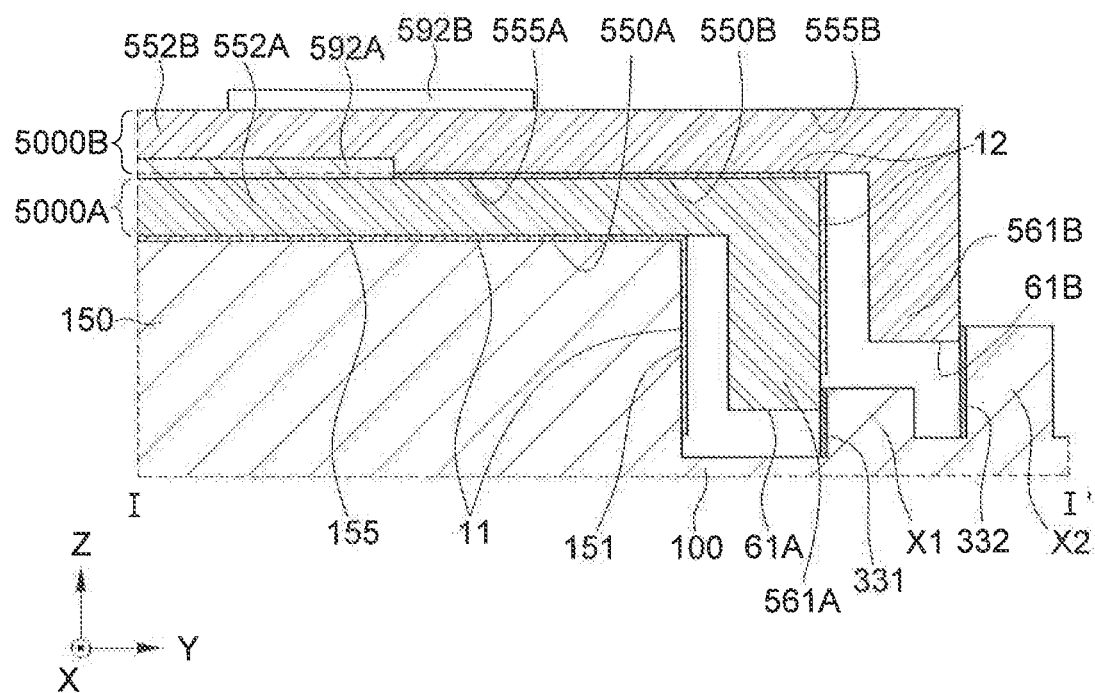
FIG. 9 is a sectional view taken along line I-I' of FIG. 3.
Figure 10:
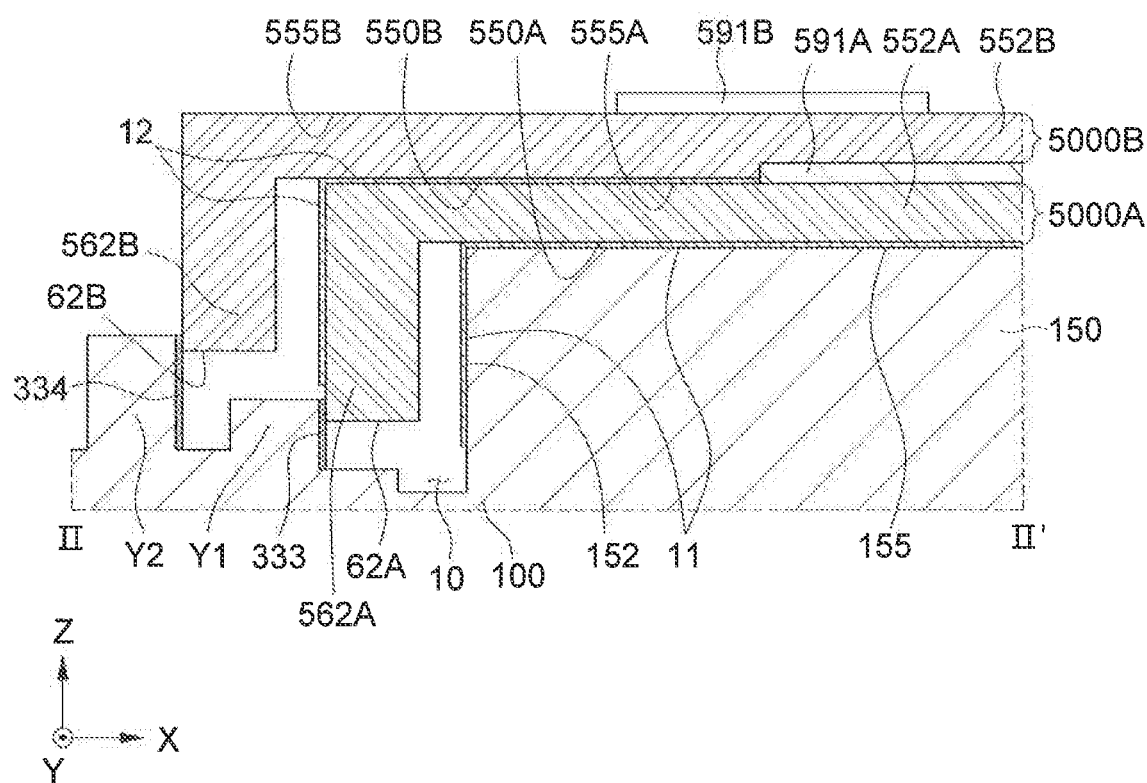
FIG. 10 is a sectional view taken along line II-II' of FIG. 3.

FIG. 9 is a sectional view taken along line I-I' of FIG. 3, and FIG. 10 is a sectional view taken along line II-II' of FIG. 3. In this case, FIGS. 9 and 10 are sectional views showing a state in which the first sub-tray 5000A, the second sub-tray 5000B, the first display panel DP, and the second display panel DP have been coupled to the main tray 1000 of FIG. 3.

As shown in FIG. 9, the packing container for a display device, according to an exemplary embodiment of the present invention, may further include elastic members 331 and 332 which are attached onto the inner surface of the first horizontal protruding portion X1 and the inner surface of the second horizontal protruding portion X2.

For example, the first elastic member 331 may be located on the surface of the first horizontal protruding portion X1 selected from the opposite surfaces of the first lower protruding portion 561A of the first sub-tray 5000A and the first horizontal protruding portion X1. For example, the first elastic member 331 may be positioned between the first horizontal protruding portion X1 and the first lower protruding portion 561A. In addition, the first elastic member 331 may be located on the surface of the first horizontal protruding portion X1 selected from the opposite surfaces of the first side surface 151 of the main tray 1000 and the first horizontal protruding portion X1.

The second elastic member 332 may be located on the surface of the second horizontal protruding portion X2 selected from the opposite surfaces of the first lower protruding portion 561B of the second sub-tray 5000B and the second horizontal protruding portion X2. For example, the second elastic member 332 may be positioned between the second horizontal protruding portion X2 and the first lower protruding portion 561B. In addition, the second elastic member 332 may be located on the surface of the second horizontal protruding portion X2 selected from the opposite surfaces of the outer surface of the first horizontal protruding portion X1 and the second horizontal protruding portion X2.

Furthermore, as shown in FIG. 10, the packing container for a display device, according to an exemplary embodiment of the present invention, may further include elastic members 333 and 334 which are attached onto the inner surface of the first vertical protruding portion Y1 and the inner surface of the second vertical protruding portion Y2.

For example, the third elastic member 333 may be located on the surface of the first vertical protruding portion Y1 selected from the opposite surfaces of the second lower protruding portion 562A of the first sub-tray 5000A and the first vertical protruding portion Y1. For example, the third elastic member 333 may be positioned between the second lower protruding portion 562A and the first vertical protruding portion Y1. Furthermore, the third elastic member 333 may be located on the surface of the first vertical protruding portion Y1 selected from the opposite surfaces of the second side surface 152 of the main tray 1000 and the first vertical protruding portion Y1.

The fourth elastic member 334 may be located on the surface of the second vertical protruding portion Y2 selected from the opposite surfaces of the second lower protruding portion 562B of the second sub-tray 5000B and the second vertical protruding portion Y2. For example, the fourth elastic member 334 may be positioned between the second lower protruding portion 562A and the first vertical protruding portion Y1. In addition, the fourth elastic member 334 may be located on the surface of the second vertical protruding portion Y2 selected from the opposite surfaces of the outer surface of the first vertical protruding portion Y1 and the second vertical protruding portion Y2.

The elastic members 331 to 334 may increase a coupling force between the sub-trays 5000A and 5000B and the main tray 1000.

Figure 11:
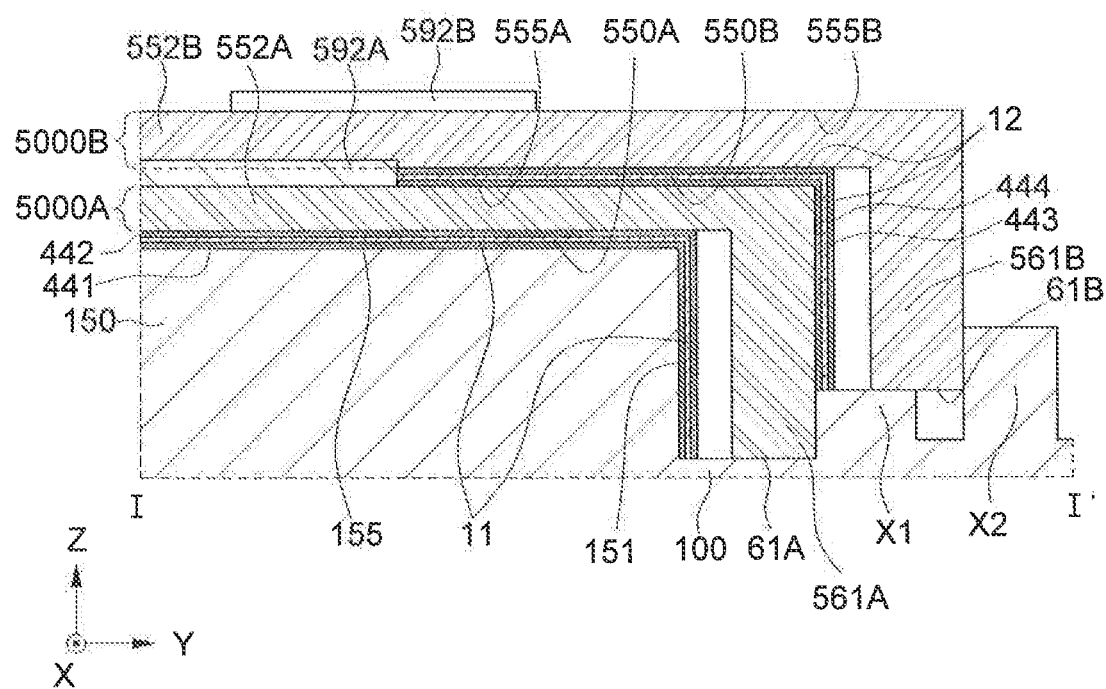
FIG. 11 is a sectional view taken along line I-I' of FIG. 3.
Figure 12:
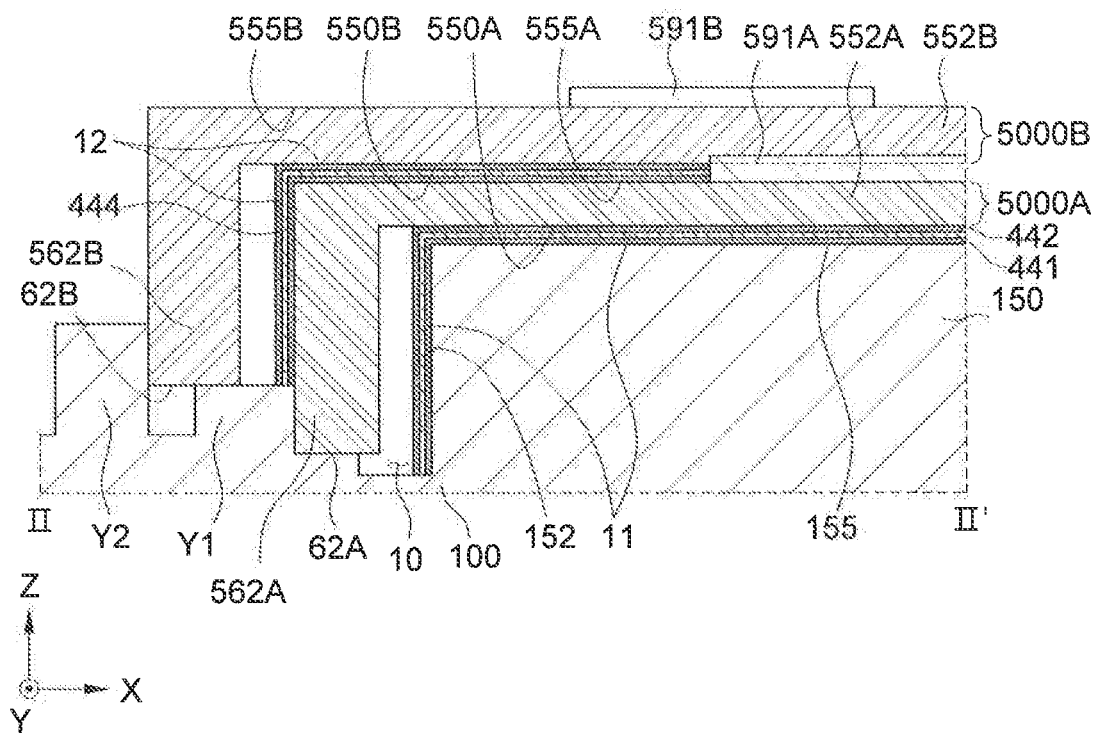
FIG. 12 is a sectional view taken along line II-II' of FIG. 3.

FIG. 11 is a sectional view taken along line I-I' of FIG. 3, and FIG. 12 is a sectional view taken along line II-II' of FIG. 3. In this case, FIGS. 11 and 12 are sectional views showing a state in which the first sub-tray 5000A, the second sub-tray 5000B, the first display panel DP, and the second display panel DP have been coupled to the main tray 1000 of FIG. 3.

As shown in FIG. 11 and FIG. 12, the packing container for a display device, according to an exemplary embodiment of the present invention, may further include one or more cushioning members 441 to 444.

For example, as shown in FIGS. 11 and 12, the first cushioning member 441 is located between the first display device 11 and the first panel support portion 150, and the second cushioning member 442 is located between the first display device 11 and the first sub-tray 5000A.

The third cushioning member 443 is located between the second display device 12 and the first sub-tray 5000A, and the fourth cushioning member 444 is located between the second display device 12 and the second sub-tray 5000B.

The cushioning members 441 to 444 may prevent a display device from being damaged.

According to the present invention, a packing container for a display device, which is capable of preventing a display panel from being separated from driving drivers, is provided.

While the present invention has been shown and described with reference to the exemplary embodiments thereof, it will be apparent to those of ordinary skill in the art that various changes in form and detail may be made thereto without departing from the spirit and scope of the present invention.

What is claimed is:

1. A packing container for a display device, the packing container comprising:
a main tray;
a first panel support portion configured to protrude from a base portion disposed inside the main tray;
a first base protruding portion configured to protrude from the base portion, and to be opposite to a first side surface of the first panel support portion; and
a first sub-tray located on the first panel support portion of the main tray,
wherein the first sub-tray comprises:
a second panel support portion located on the main tray, wherein the second panel support portion is opposite to a panel support surface of the first panel support portion; and
a first lower protruding portion configured to protrude from a first edge of the second panel support portion toward the base portion, and to have an end portion disposed inside a groove between the first panel support portion and the first base protruding portion, wherein the groove is defined by the first panel support portion and the first base protruding portion.

2. The packing container of claim 1, wherein:
the first sub-tray further comprises a first upper protruding portion configured to protrude from a second edge of the second panel support portion opposite to the first edge of the second panel support portion, wherein
the first upper protruding portion protrudes in a direction opposite to a direction in which the first lower protruding portion protrudes.

3. The packing container of claim 2, wherein a first surface of the first lower protruding portion of the first sub-tray is in contact with and faces a first surface of the first base protruding portion.

4. The packing container of claim 2, wherein the main tray further comprises a second base protruding portion configured to protrude from the base portion and to be opposite to the first side surface with the first base protruding portion disposed therebetween.

5. The packing container of claim 4, further comprising a second sub-tray located on the first sub-tray.

6. The packing container of claim 5, wherein the second sub-tray comprises:
a third panel support portion located on the first sub-tray, wherein the third panel support portion is opposite to a panel support surface of the second panel support portion; and
a first lower protruding portion configured to protrude from a first edge of the third panel support portion toward the base portion and to have an end portion located between the first lower protruding portion of the first sub-tray and the second base protruding portion.

7. The packing container of claim 6, wherein a first surface of the first lower protruding portion of the second sub-tray is in contact with and faces a first surface of the second base protruding portion.

8. The packing container of claim 6, wherein a first surface of the first lower protruding portion of the second sub-tray and a first surface of the first lower protruding portion of the first sub-tray are opposite each other and do not come into contact with each other.

9. The packing container of claim 6, wherein a second edge of the third panel support portion opposite to the first edge of the third panel support portion is adjacent to the first upper protruding portion of the first sub-tray.

10. The packing container of claim 4, wherein the second base protruding portion has a length different from that of the first base protruding portion.

11. The packing container of claim 4, wherein the second base protruding portion has a height different from that of the first base protruding portion.

12. The packing container of claim 6, wherein the main tray further comprises a third base protruding portion configured to protrude from the base portion and to be opposite to a second side surface of the first panel support portion.

13. The packing container of claim 12, wherein the first sub-tray further comprises a second lower protruding portion configured to protrude from a third edge of the second panel support portion adjacent to the first edge of the second panel support portion toward the base portion and to have an end portion located between the second side surface of the first panel support portion and the third base protruding portion.

14. The packing container of claim 12, wherein the main tray further comprises a fourth base protruding portion configured to protrude from the base portion and to be opposite to the second side surface of the first panel support portion with the third base protruding portion interposed therebetween.

15. The packing container of claim 14, wherein the fourth base protruding portion has a length different from that of the third base protruding portion.

16. The packing container of claim 14, wherein the fourth base protruding portion has a height different from that of the third base protruding portion.

17. The packing container of claim 1, wherein the end portion of the first lower protruding portion of the first sub-tray comes into contact with the base portion.

18. The packing container of claim 1, further comprising an elastic member located between a first surface of the first lower protruding portion of the first sub-tray and a first surface of the first base protruding portion.

19. The packing container of claim 1, further comprising a cushioning member disposed between the second panel support portion of the first sub-tray and the first panel support portion.

20. The packing container of claim 1, wherein an uppermost surface of the first panel support portion is higher than an uppermost surface of the first base protruding portion.

21. The packing container of claim 1, wherein an uppermost surface of the first panel support portion is at a different height from that of an uppermost surface of the first base protruding portion.

22. A packing container for a display device, the packing container comprising:
a main tray;
a first panel support portion configured to protrude from a base portion disposed inside the main tray;
a first base protruding portion configured to protrude from the base portion, and to be opposite to a first side surface of the first panel support portion;
a first sub-tray located on the first panel support portion of the main tray; and
a second sub-tray located on the first sub-tray,
wherein the first sub-tray comprises:
a second panel support portion located on the main tray, wherein the second panel support portion is opposite to a panel support surface of the first panel support portion; and
a first lower protruding portion configured to protrude from a first edge of the second panel support portion toward the base portion, and to have an end portion located between the first side surface of the first panel support portion and the first base protruding portion,
wherein;
the first sub-tray further comprises a first upper protruding portion configured to protrude from a second edge of the second panel support portion opposite to the first edge of the second panel support portion, wherein
the first upper protruding portion protrudes in a direction opposite to a direction in which the first lower protruding portion protrudes,
wherein the main tray further comprises a second base protruding portion configured to protrude from the base portion and to be opposite to the first side surface with the first base protruding portion disposed therebetween,
wherein the second sub-tray comprises:
a third panel support portion located on the first sub-tray, wherein the third panel support portion is opposite to a panel support surface of the second panel support portion; and
a first lower protruding portion configured to protrude from a first edge of the third panel support portion toward the base portion and to have an end portion located between the first lower protruding portion of the first sub-tray and the second base protruding portion,
wherein the main tray further comprises a third base protruding portion configured to protrude from the base portion and to be opposite to a second side surface of the first panel support portion,
wherein the first sub-tray further comprises a second lower protruding portion configured to protrude from a third edge of the second panel support portion adjacent to the first edge of the second panel support portion toward the base portion and to have an end portion located between the second side surface of the first panel support portion and the third base protruding portion,
wherein a first surface of the second lower protruding portion of the first sub-tray and a first surface of the third base protruding portion face each other and come into contact with each other.

23. The packing container of claim 22, wherein the second sub-tray further comprises a second lower protruding portion configured to protrude from a third edge of the third panel support portion adjacent to the first edge of the third panel support portion toward the base portion and to have an end portion located between the second lower protruding portion of the first sub-tray and a fourth base protruding portion.

24. The packing container of claim 23, wherein a first surface of the second lower protruding portion of the second sub-tray and the first surface of the second lower protruding portion of the first sub-tray face each other and do not come into contact with each other.

25. The packing container of claim 24, wherein:
the first sub-tray further comprises a second upper protruding portion configured to protrude from a fourth edge of the second panel support portion adjacent to the first edge of the second panel support portion, and
the second upper protruding portion protrudes in a direction opposite to a direction in which the first lower protruding portion protrudes.

26. The packing container of claim 25, wherein the third edge of the third panel support portion adjacent to the first edge of the third panel support portion is opposite to the second upper protruding portion of the first sub-tray.

27. A packing container, the packing container comprising:
a main tray;
a first panel support portion protruding from a base portion of the main tray;
a first base protruding portion protruding from the base portion and extending along a first side surface of the first panel support portion;
a second base protruding portion protruding from the base portion and extending along the first side surface of the first panel support portion, wherein an uppermost surface of the second base protruding portion is higher than an uppermost surface of the first base protruding portion;
a first sub-tray disposed on the first panel support portion, wherein the first sub-tray comprises:
a second panel support portion disposed on a top surface of the first panel support portion; and
a first lower protruding portion extending from the second panel support portion and overlapping the first side surface of the first panel support portion; and
a second sub-tray disposed on the first sub-tray, wherein the second sub-tray comprises:
a third panel support portion disposed on the second panel support portion; and
a first lower protruding portion extending from the third panel support portion and overlapping the first lower protruding portion of the first sub-tray.

28. The packing container of claim 27, wherein the first base protruding portion has a length extending parallel to the first side surface of the first panel support portion, the second base protruding portion has a length extending parallel to the first side surface of the first panel support portion, and the length of the second base protruding portion is greater than the length of the first base protruding portion.

* * * * *